(12) United States Patent
Aiba et al.

(10) Patent No.: US 11,425,748 B2
(45) Date of Patent: Aug. 23, 2022

(54) USER EQUIPMENTS, BASE STATIONS AND METHODS FOR SP-CSI REPORTING

(71) Applicants: Sharp Kabushiki Kaisha, Sakai (JP); FG Innovation Company Limited, Hong Kong (CN)

(72) Inventors: Tatsushi Aiba, Osaka (JP); Zhanping Yin, Vancouver, WA (US); Kai Ying, Vancouver, WA (US)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 74 days.

(21) Appl. No.: 16/968,725

(22) PCT Filed: Jan. 24, 2019

(86) PCT No.: PCT/US2019/014925
§ 371 (c)(1),
(2) Date: Aug. 10, 2020

(87) PCT Pub. No.: WO2019/160660
PCT Pub. Date: Aug. 22, 2019

(65) Prior Publication Data
US 2021/0014881 A1    Jan. 14, 2021

Related U.S. Application Data

(60) Provisional application No. 62/631,187, filed on Feb. 15, 2018.

(51) Int. Cl.
*H04W 72/12* (2009.01)
*H04B 7/06* (2006.01)
(Continued)

(52) U.S. Cl.
CPC ...... *H04W 72/1284* (2013.01); *H04B 7/0626* (2013.01); *H04L 69/324* (2013.01); *H04W 72/042* (2013.01)

(58) Field of Classification Search
CPC ......... H04W 72/1278; H04W 72/1284; H04W 72/04; H04W 72/0406; H04W 72/042;
(Continued)

(56) References Cited

U.S. PATENT DOCUMENTS

2010/0128614 A1    5/2010   Kuusela et al.
2011/0305211 A1    12/2011  Lunttila et al.
(Continued)

OTHER PUBLICATIONS

3GPP TS 36.212 V15.0.0, 3rd Generation Partnership Project; Technical Specification Group Radio Access Network; Evolved Universal Terrestrial Radio Access (E-UTRA); Multiplexing and channel coding (Release 15), Dec. 2017.
(Continued)

*Primary Examiner* — Warner Wong
(74) *Attorney, Agent, or Firm* — Austin Rapp

(57) ABSTRACT

A user equipment (UE) is described. The user equipment includes receiving circuitry configured to receive a radio resource control (RRC) signal comprising first information. The receiving circuity is also configured to monitor a physical downlink control channel (PDCCH). The user equipment also includes transmitting circuitry configured to perform semi-persistent channel state information (SP-CSI) reporting. The user equipment also includes processing circuitry configured to drop the SP-CSI reporting based on that the SP-CSI reporting is being performed without multiplexing with an uplink shared channel (UL-SCH) and the SP-CSI reporting overlaps in time with a positive scheduling request (SR) transmission. The processing circuitry is also configured to drop the SP-CSI reporting based on that the
(Continued)

SP-CSI reporting overlaps in time with an UL-SCH transmission in one symbol.

4 Claims, 12 Drawing Sheets

(51) Int. Cl.
  *H04L 69/324* (2022.01)
  *H04W 72/04* (2009.01)
(58) Field of Classification Search
  CPC ............ H04W 28/02; H04W 28/0231; H04W 28/0236; H04L 69/30; H04L 69/32; H04L 69/322; H04L 69/324; H04B 7/0619; H04B 7/0621; H04B 7/0626
  See application file for complete search history.

(56) References Cited

U.S. PATENT DOCUMENTS

| | | | |
|---|---|---|---|
| 2015/0043458 A1 | 2/2015 | Seo et al. | |
| 2016/0105817 A1* | 4/2016 | Frenne | H04L 1/0026 370/252 |
| 2017/0195031 A1 | 7/2017 | Onggosanusi et al. | |
| 2019/0223036 A1* | 7/2019 | Lunttila | H04L 5/0057 |
| 2019/0349125 A1* | 11/2019 | Gao | H04L 5/0053 |
| 2019/0394785 A1* | 12/2019 | He | H04W 72/10 |
| 2021/0006314 A1* | 1/2021 | Takeda | H04B 7/0626 |
| 2021/0068138 A1* | 3/2021 | Baldemair | H04W 72/0413 |
| 2021/0083797 A1* | 3/2021 | Gao | H04L 1/1819 |
| 2021/0105090 A1* | 4/2021 | Park | H04B 7/0404 |
| 2021/0242963 A1* | 8/2021 | Gao | H04L 1/0027 |
| 2021/0329676 A1* | 10/2021 | Yang | H04W 4/44 |

OTHER PUBLICATIONS

3GPP TS 36.213 V15.0.0, 3rd Generation Partnership Project; Technical Specification Group Radio Access Network; Evolved Universal Terrestrial Radio Access (E-UTRA); Physical Layer Procedures (Release 15), Dec. 2017.

3GPP TS 36.214 V15.0.0, 3rd Generation Partnership Project; Technical Specification Group Radio Access Network; Evolved Universal Terrestrial Radio Access (E-UTRA); Physical layer; Measurements (Release 15), Sep. 2017.

3GPP TS 38.211 V2.0.0, 3rd Generation Partnership Project; Technical Specification Group Radio Access Network; NR; Physical channels and modulation (Release 15), Dec. 2017.

* cited by examiner

Supported Transmission Numerologies

| $\mu$ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Number of OFDM Symbols Per Slot

| | | Slot configuration | | | |
|---|---|---|---|---|---|
| | | 0 | | 1 | |
| $\mu$ | $N^{slot}_{symb}$ | $N^{frame,\mu}_{slot}$ | $N^{subframe,\mu}_{slot}$ | $N^{slot}_{symb}$ | $N^{frame,\mu}_{slot}$ | $N^{subframe,\mu}_{slot}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

FIG. 2 a) Special fields for Configured grant Type2 UL transmission Activation PDCCH Validation

| | DCI format 0_0/0_1 |
|---|---|
| TPC command for scheduled PUSCH | set to '00' |
| HARQ process number | set to all '0's |
| Modulation and coding scheme | MSB is set to '0' |
| Redundancy version | set to '00' |
| New data indicator | set to '0' | b) Special fields for Configured grant Type2 UL transmission Deactivation (Release) PDCCH Validation

| | DCI format 0_0/0_1 |
|---|---|
| TPC command for scheduled PUSCH | set to '00' |
| HARQ process number | set to all '0's |
| Modulation and coding scheme | set to all '1's |
| Resource block assignment | set to all '1's |
| Redundancy version | set to '00' |
| New data indicator | set to '0' | c) Special fields for SP-CSI reporting on PUSCH Activation PDCCH Validation

| | DCI format 0_0/0_1 |
|---|---|
| TPC command for scheduled PUSCH | set to '00' |
| HARQ process number | set to all '0's |
| Modulation and coding scheme | MSB is set to '0' |
| Redundancy version | set to '11' |
| New data indicator | set to '1' | d) Special fields for SP-CSI reporting on PUSCH Deactivation (Release) PDCCH Validation

| | DCI format 0_0/0_1 |
|---|---|
| TPC command for scheduled PUSCH | set to '00' |
| HARQ process number | set to all '0's |
| Modulation and coding scheme | set to all '1's |
| Resource block assignment | set to all '1's |
| Redundancy version | set to '11' |
| New data indicator | set to '1' |
| CSI request field | set to all '0's |

FIG. 5

USER EQUIPMENTS, BASE STATIONS AND METHODS FOR SP-CSI REPORTING

RELATED APPLICATIONS

This application is related to and claims priority from U.S. Provisional Patent Application No. 62/631,187, entitled "USER EQUIPMENTS, BASE STATIONS AND METHODS," filed on Feb. 15, 2018, which is hereby incorporated by reference herein, in its entirety.

TECHNICAL FIELD

The present disclosure relates generally to communication systems. More specifically, the present disclosure relates to user equipments (UEs), base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 2 shows examples of multiple numerologies;

FIG. 5 shows examples of downlink control information (DCI) for activation;

DETAILED DESCRIPTION

Figure 1:
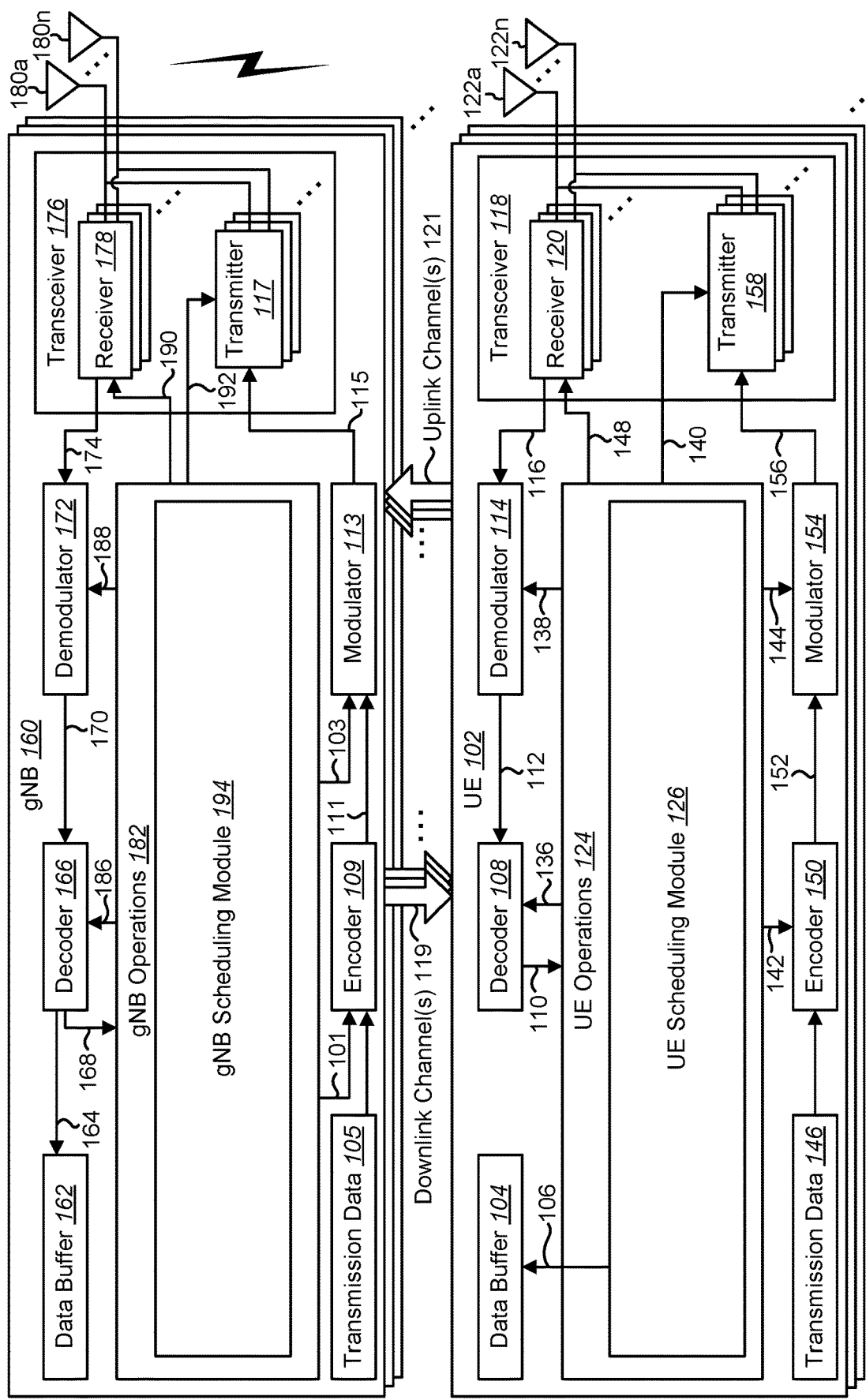
FIG. 1 is a block diagram illustrating one implementation of one or more base stations (gNBs) and one or more user equipments (UEs) in which systems and methods for downlink and/or uplink (re)transmissions may be implemented.

A user equipment is described. The user equipment includes receiving circuitry configured to receive a radio resource control (RRC) message comprising information used for configuring a monitoring periodicity for a physical downlink control channel (PDCCH). The receiving circuity is also configured to monitor, based on the information, the PDCCH for a downlink control information (DCI) format with cyclic redundancy check (CRC) scrambled by a semi-persistent channel state information radio network temporary identifier (SP-CSI-RNTI), wherein the DCI format is used for scheduling of a physical uplink shared channel (PUSCH). The user equipment also includes transmitting circuitry configured to perform, based on decoding of the DCI format indicating a semi-persistent CSI reporting on the PUSCH, the semi-persistent CSI reporting on the PUSCH based on a parameter, wherein the parameter is indicated by using a CSI request field comprised in the DCI format. The user equipment also includes processing circuitry configured to drop the semi-persistent CSI reporting based on that the semi-persistent CSI reporting is being performed without multiplexing with an uplink shared channel (UL-SCH) and the semi-persistent CSI reporting overlaps in time with a positive scheduling request (SR) transmission on a physical uplink control channel (PUCCH). The processing circuitry is also configured to drop the semi-persistent CSI reporting based on that the semi-persistent CSI reporting overlaps in time with an uplink shared channel (UL-SCH) transmission on the PUSCH in one symbol.

A base station apparatus is also described. The base station apparatus includes transmitting circuitry configured to transmit a radio resource control (RRC) message comprising information used for configuring a monitoring periodicity for a physical downlink control channel (PDCCH). The transmitting circuitry is also configured to transmit on a physical downlink control channel (PDCCH), based on the information, a downlink control information (DCI) format with cyclic redundancy check (CRC) scrambled by a semi-persistent channel state information radio network temporary identifier (SP-CSI-RNTI), wherein the DCI format is used for scheduling of a physical uplink shared channel (PUSCH). The base station apparatus also includes receiving circuitry configured to receive, based on transmitting of the DCI format indicating a semi-persistent CSI reporting on the PUSCH, the semi-persistent CSI reporting on the PUSCH based on a parameter, wherein the parameter is indicated by using a CSI request field comprised in the DCI format. The semi-persistent CSI reporting is dropped based on that the semi-persistent CSI reporting is being performed without multiplexing with an uplink shared channel (UL-SCH) and the semi-persistent CSI reporting overlaps in time with a positive scheduling request (SR) transmission on a physical uplink control channel (PUCCH). The semi-persistent CSI reporting is dropped based on that the semi-persistent CSI reporting overlaps in time with an uplink shared channel (UL-SCH) transmission on the PUSCH in one symbol.

A communication method of a user equipment is also described. The method includes receiving a radio resource control (RRC) message comprising information used for configuring a monitoring periodicity for a physical downlink control channel (PDCCH). The method also includes monitoring, based on the information, the PDCCH for a downlink control information (DCI) format with cyclic redundancy check (CRC) scrambled by a semi-persistent channel state information radio network temporary identifier (SP-CSI-RNTI), wherein the DCI format is used for scheduling of a physical uplink shared channel (PUSCH). The method also includes performing, based on decoding of the DCI format indicating a semi-persistent CSI reporting on the PUSCH, the semi-persistent CSI reporting on the PUSCH based on a parameter, wherein the parameter is indicated by using a CSI request field comprised in the DCI format. The semi-persistent CSI reporting is dropped based on that the semi-persistent CSI reporting is being performed without multiplexing with an uplink shared channel (UL-SCH) and the semi-persistent CSI reporting overlaps in time with a positive scheduling request (SR) transmission on a physical uplink control channel (PUCCH). The semi-persistent CSI reporting is dropped based on that the semi-persistent CSI reporting overlaps in time with an uplink shared channel (UL-SCH) transmission on the PUSCH in one symbol.

A communication method of a base station apparatus also described. The method includes transmitting a radio resource control (RRC) message comprising information used for configuring a monitoring periodicity for a physical downlink control channel (PDCCH). The method also includes transmitting on a physical downlink control channel (PDCCH), based on the information, a downlink control information (DCI) format with cyclic redundancy check (CRC) scrambled by a semi-persistent channel state information radio network temporary identifier (SP-CSI-RNTI), wherein the DCI format being used for scheduling of a physical uplink shared channel (PUSCH). The method also includes receiving, based on transmitting of the DCI format indicating a semi-persistent CSI reporting on the PUSCH, the semi-persistent CSI reporting on the PUSCH based on a parameter, the parameter being indicated by using a CSI request field comprised in the DCI format. The semi-persistent CSI reporting is dropped based on that the semi-persistent CSI reporting is being performed without multiplexing with an uplink shared channel (UL-SCH) and the semi-persistent CSI reporting overlaps in time with a positive scheduling request (SR) transmission on a physical uplink control channel (PUCCH). The semi-persistent CSI reporting is dropped based on that the semi-persistent CSI reporting overlaps in time with an uplink shared channel (UL-SCH) transmission on the PUSCH in one symbol.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

The 5th generation communication systems, dubbed NR (New Radio technologies) by 3GPP, envision the use of time/frequency/space resources to allow for services, such as eMBB (enhanced Mobile Broad-Band) transmission, URLLC (Ultra Reliable and Low Latency Communication) transmission, and eMTC (massive Machine Type Communication) transmission. Also, in NR, one or more bandwidth parts (BWPs) may be specified (e.g., configured) for a serving cell. A user equipment (UE) may receive a downlink signal(s) in the BWP(s) of the serving cell. Also, the UE may transmit an uplink signal(s) in the BWP(s) of the serving cell.

In order for the services to use the time, frequency, and/or space resources efficiently, it would be useful to be able to efficiently control downlink and/or uplink transmissions. Therefore, a procedure for efficient control of downlink and/or uplink transmissions should be designed. However, the detailed design of a procedure for downlink and/or uplink transmissions has not been studied yet.

In some approaches, a user equipment (UE) may receive a random access response grant. Also, the UE may receive on a physical downlink control channel (PDCCH), DCI format used for activating semi-persistent channel state information (SP-CSI) reporting on a physical uplink shared channel (PUSCH). Also, the UE may perform, based on the reception of the random access response grant, the PUSCH transmission. Also, the UE may perform, based on the reception of the DCI format used for activating the SP-CSI reporting on the PUSCH, the SP-CSI reporting on the PUSCH. Here, in a case that the PUSCH transmission collides with the SP-CSI reporting on the PUSCH, the SP-CSI reporting on the PUSCH is skipped and only the PUSCH transmission that corresponds to the random access response grant is performed.

A UE may receive on a physical downlink control channel (PDCCH), first DCI format used for activating a configured grant for transmission on a physical uplink shared channel (PUSCH). Also, the UE may receive on the PDCCH, second DCI format used for activating semi-persistent channel state information (SP-CSI) reporting on the PUSCH. Also, the UE may transmit, based on the reception of the first DCI format, Medium Access Control (MAC) Control Element (CE) for first confirmation information. Also, the UE may transmit, based on the reception of the second DCI format, MAC CE for second confirmation information. Here, in a logical channel prioritization procedure, the MAC CE for the first confirmation information is prioritized over the MAC CE for the second confirmation information.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for downlink and/or uplink (re)transmissions may be implemented. The one or more UEs 102 communicate with one or more gNBs 160 using one or more physical antennas 122a-n. For example, a UE 102 transmits electromagnetic signals to the gNB 160 and receives electromagnetic signals from the gNB 160 using the one or more physical antennas 122a-n. The gNB 160 communicates with the UE 102 using one or more physical antennas 180a-n. In some implementations, the term "base station," "eNB," and/or "gNB" may refer to and/or may be replaced by the term "Transmission Reception Point (TRP)." For example, the gNB 160 described in connection with FIG. 1 may be a TRP in some implementations.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (Physical Uplink Shared Channel)) and/or a physical control channel (e.g., PUCCH (Physical Uplink Control Channel)), etc. The one or more gNBs 160 may also transmit information or data to the one or more UEs 102 using one or more downlink channels 119, for instance. Examples of downlink channels 119 physical shared channel (e.g., PDSCH (Physical Downlink Shared Channel) and/or a physical control channel (PDCCH (Physical Downlink Control Channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE scheduling module 126.

The UE scheduling module 126 may perform downlink reception(s) and uplink transmission(s). The downlink reception(s) include reception of data, reception of downlink control information, and/or reception of downlink reference signals. Also, the uplink transmissions include transmission of data, transmission of uplink control information, and/or transmission of uplink reference signals.

In a radio communication system, physical channels (uplink physical channels and/or downlink physical channels) may be defined. The physical channels (uplink physical channels and/or downlink physical channels) may be used for transmitting information that is delivered from a higher layer.

For example, in uplink, a PRACH (Physical Random Access Channel) may be defined. For instance, the PRACH may be used for a random access preamble (e.g., a message 1 (Msg.1)) transmission in a random access procedure. Here, the random access procedure may include a contention based random access procedure (e.g., a CBRA procedure) and/or a non-contention based random access procedure (e.g., a contention free random access procedure (e.g., a CFRA procedure)). In some approaches, the PRACH (e.g., the random access procedure) may be used for an initial access connection establishment procedure, a handover procedure, a connection re-establishment, a timing adjustment (e.g., a synchronization for an uplink transmission, for UL synchronization) and/or for requesting an uplink shared channel (UL-SCH) resource (e.g., the uplink PSCH (e.g., PUSCH) resource).

In another example, a PCCH (Physical Control Channel) may be defined. The PCCH may be used to transmit control information. In uplink, PCCH (e.g., Physical Uplink Control Channel (PUCCH)) is used for transmitting Uplink Control Information (UCI). The UCI may include Hybrid Automatic Repeat Request (HARQ-ACK), channel state information (CSI) and/or a scheduling request (SR). The HARQ-ACK is used for indicating a positive acknowledgement (ACK) or a negative acknowledgment (NACK) for downlink data (e.g., Transport block(s), Medium Access Control Protocol Data Unit (MAC PDU) and/or Downlink Shared Channel (DL-SCH)). The CSI is used for indicating state of downlink channel (e.g., a downlink signal(s), a PDSCH (e.g., Physical Downlink Shared Channel)). Here, the CSI reporting may be periodic, semi-persistent, and/or aperiodic. Also, the SR is used for requesting resources of uplink data (e.g., Transport block(s), MAC PDU and/or Uplink Shared Channel (UL-SCH)). For example, the SR is used for requesting the UL-SCH resources (e.g., for an initial transmission (e.g., a new transmission)). Here, the SR may be transmitted on the PUSCH and/or the PUCCH.

Here, the DL-SCH and/or the UL-SCH may be a transport channel that is used in the MAC layer. Also, a transport block(s) (TB(s)) and/or a MAC PDU may be defined as a unit(s) of the transport channel used in the MAC layer. For example, control, management, and/or process of HARQ may be performed, in the MAC layer, per the transport block. The transport block may be defined as a unit of data delivered from the MAC layer to the physical layer. The MAC layer may deliver the transport block to the physical layer (i.e., the MAC layer delivers the data as the transport block to the physical layer). In the physical layer, the transport block may be mapped to one or more codewords.

In downlink, the PCCH (e.g., Physical Downlink Control Channel (PDCCH)) may be used for transmitting downlink control information (DCI). Here, more than one DCI format may be defined (e.g., configured) for DCI transmission on the PCCH. Namely, fields may be defined in the DCI format, and the fields are mapped to the information bits (e.g., DCI bits). For example, a DCI format 1_0, and/or a DCI format 1_1 that are used for scheduling of the PDSCH(s) in a cell (e.g., in one DL cell) may be defined as a DCI format(s) for the downlink. Also, a DCI format 0_0, and/or a DCI format 0_1 that are used for scheduling of the PUSCH(s) in a cell (e.g., in one UL cell) may be defined as a DCI format(s) for the uplink.

Here, as described above, a RNTI(s) assigned (e.g., by the gNB 160) to the UE 102 may be used for transmission of DCI (e.g., the DCI format(s), DL control channel(s) (e.g., the PDCCH(s)). Namely, CRC (Cyclic Redundancy Check) parity bits (also referred to simply as CRC), which are generated based on DCI, are attached to DCI, and, after attachment, the CRC parity bits are scrambled by the RNTI(s). The UE 102 may attempt to decode (e.g., blind decoding, monitor, detect) DCI to which the CRC parity bits scrambled by the RNTI(s) are attached. Namely, the UE 102 detects DL control channel (e.g., the PDCCH, the DCI, the DCI format(s)) based on the blind decoding. That is, the UE 102 may decode the DL control channel(s) with the CRC scrambled by the RNTI(s). Namely, the UE 102 may decode the DCI format(s) with the CRC scrambled by the RNTI(s). In other words, the UE 102 may monitor the DL control channel(s) with the CRC scrambled by the RNTI(s). Namely, the UE 102 may monitor the DCI format(s) with the CRC scrambled by the RNTI. Also, as described below, the UE 102 may detect the DCI format(s) in a USS (i.e., the CORESET of a USS (i.e., a UE-specific search space)) and/or a CSS (i.e., the CORESET of a CSS (i.e., a common search space, a UE-common search space)).

Here, the RNTI(s) may include C-RNTI (Cell-RNTI), CS-RNTI (Configured Scheduling RNTI), SP-CSI C-RNTI (Semi persistent-CSI C-RNTI, SP-CSI-RNTI), SI-RNTI (System Information RNTI), P-RNTI (Paging RNTI), RA-RNTI (Random Access-RNTI), and/or Temporary C-RNTI.

For example, the C-RNTI may be a unique identification used for identifying a RRC connection and/or scheduling. Also, the CS-RNTI may be a unique identification used for scheduling of transmissions based on a configured grant. For example, the CS-RNTI may be a unique identification used for activating and/or deactivating transmissions based on the configured grant (e.g., a Type2 configured grant). Also, the SP-CSI C-RNTI may be a unique identification used for SP-CSI transmission (i.e., Semi-persistent CSI reporting). For example, the SP-CSI C-RNTI may be a unique identification used for activating and/or deactivating SP-CSI transmission. Also, the SI-RNTI may be used for broadcasting of SI. Also, the P-RNTI may be used for transmission of paging and/or SI change notification. Also, the RA-RNTI may be an identification used for the random access procedure. Also, the Temporary C-RNTI may be used for the random access procedure (e.g., used for indicating (re) transmission on the UL-SCH (e.g., message 3 transmission, PUSCH transmission) in the contention based random access procedure).

Also, for example, PSCH may be defined. For example, in a case that the downlink PSCH resource (e.g., the PDSCH, the PDSCH resource) is scheduled by using the DCI format(s) for the downlink, the UE 102 may receive the downlink data, on the scheduled downlink PSCH resource (e.g., the PDSCH, the PDSCH resource). Also, in a case that the uplink PSCH resource (e.g., the PUSCH, the PUSCH resource) is scheduled by using the DCI format(s) for the uplink, the UE 102 transmits the uplink data, on the scheduled uplink PSCH resource (e.g., the PUSCH, the PUSCH resource). Namely, the downlink PSCH may be used to transmit the downlink data (i.e., the DL-SCH, a downlink transport block(s)). And, the uplink PSCH may be used to transmit the uplink data (i.e., the UL-SCH, an uplink transport block(s)).

Furthermore, the downlink PSCH (e.g., the PDSCH) and/or the uplink PSCH (e.g., the PUSCH) may be used to transmit information of a higher layer (e.g., a radio resource control (RRC)) layer, and/or a MAC layer). For example, the downlink PSCH (e.g., the PDSCH) (i.e., from the gNB 160 to the UE 102) and/or the uplink PSCH (e.g., the PUSCH) (i.e., from the UE 102 to the gNB 160) may be used to transmit a RRC message (a RRC signal). Also, the downlink PSCH (e.g., the PDSCH) (i.e., from the gNB 160 to the UE 102) and/or the uplink PSCH (e.g., the PUSCH) (i.e., from the UE 102 to the gNB 160) may be used to transmit a MAC control element (a MAC CE). Here, the RRC message that is transmitted from the gNB 160 in the downlink may be common to multiple UEs 102 (and/or multiple serving cells, and/or multiple bandwidth parts (BPWs)) within a cell (referred as a common RRC message). Also, the RRC message that is transmitted from the gNB 160 may be dedicated to a certain UE 102 (and/or a certain serving cell (i.e., a serving cell-dedicated), and/or a BWP (i.e., a BWP-dedicated)) (referred to as a dedicated RRC message). The RRC message and/or the MAC CE are also referred to as a higher layer signal.

In some approaches, the downlink PSCH (e.g., the PDSCH) may be used for transmitting (e.g., notifying, specifying, identifying, etc.) a random access response (e.g., a message 2 (Msg.2)). For example, the downlink PSCH (e.g., the PDSCH) for the random access response may be scheduled by using the downlink PCH (e.g., the PDCCH) with RA-RNTI (random access RNTI (radio network temporary identifier)). For instance, the random access response grant included in the random access response may be used for scheduling of the uplink PSCH (e.g., the PUSCH, a message 3 (Msg.3) in the random access procedure (e.g., the contention based random access procedure)). Namely, the PUSCH transmission (e.g., the message 3 (Msg. 3 transmission)) is scheduled by using the random access response grant as a part of the contention based random access procedure. The random access response grant may be delivered from the higher layer (e.g., the MAC layer) to the physical layer.

In some approaches, a PBCH (physical broadcast channel, (e.g., primary PBCH)) may be defined. For example, the PBCH may be used for broadcasting the MIB (master information block). For instance, the MIB may be used by multiple UEs 102 and may include system information transmitted on the BCH (broadcast channel). Also, the MIB may include information (e.g., an information block) for configuring a secondary PBCH. Furthermore, the MIB may include information (e.g., an information block) for configuring the downlink PSCH (e.g., PDSCH). For example, the PBCH (e.g., MIB) may be used for carrying, at least, information indicating a SFN (system frame number).

Here, the system information may be divided into the MIB and a number of SIB(s) (system information block(s)). The MIB may include a limited number of most essential and/or most frequently transmitted information (e.g., parameter(s)) that are needed to acquire other information from the cell. Namely, the PBCH (e.g., MIB) may include minimum system information. Also, the SIB(s) may be carried in a system information message. For example, the SIB(s) may be transmitted on the secondary PBCH and/or the downlink PSCH (e.g., the PDSCH). The SIB(s) (e.g., System Information Block Type 2) may include remaining minimum system information (i.e., RMSI). For example, the SIB(s) (e.g., System Information Block Type 2) may contain radio resource configuration information that is common for multiple UEs 102.

In some approaches, the SIB(s) may contain information for a random access channel configuration (e.g., a random access configuration for a preamble format) that is used for the random access procedure (e.g., the random access preamble transmission (Msg.1 transmission)). For example, the information for the random access configuration may include the preamble format, the SFN, a subframe number (e.g., a subframe number, a slot number and/or a symbol number). Also, a part of the information for the random access configuration may be included in the MIB (e.g., PBCH).

In some approaches, in downlink, a SS (Synchronization Signal) may be defined. The SS may be used for synchronizing downlink time-frequency (a time domain and/or a frequency domain). The SS may include a PSS (Primary Synchronization Signal). Additionally or alternatively, the SS may include a SSS (Secondary Synchronization Signal). Here, an SS/PBCH block(s) may be defined (e.g., specified). For example, in the time domain, an SS/PBCH block may consist of 4 OFDN symbols, numbered in increasing order from 0 to 3 within the SS/PBCH block, where the PSS, the SSS and the PBCH, DM-RS associated with the PBCH are mapped to different symbols.

Namely, the SS/PBCH block may consist of the PSS, the SSS, the PBCH, and/or the DM-RS associated with the PBCH. And, the UE 102 may assume that reception occasions of the PSS, the SSS, the PBCH, the DM-RS associated with the PBCH are in consecutive symbols. Also, for example, in the frequency domain, an SS/PBCH block consists of 240 contiguous subcarriers with the subcarriers numbered in increasing order from 0 to 239 within the SS/PBCH block. For example, the PSS, and/or the SSS may be used for identifying a physical layer cell identity. Additionally or alternatively, the PSS, and/or the SSS may be used for identifying an identity for one or more beams, one or more TRPs and/or one or more antenna ports. Namely, the UE receives the PSS, and/or the SSS in order to perform cell search. Additionally or alternatively, the PBCH may be used for carrying information identifying SF number (System Frame number), an OFDM symbol index, a slot index in a radio frame and/or a radio frame number. Here, the SS/PBCH block(s) described herein may be assumed to be included in a SS block(s) in some implementations for the sake of simplifying description.

In the radio communication for uplink, UL RS(s) may be used as uplink physical signal(s). The uplink physical signal may not be used to transmit information that is provided from the higher layer, but is used by a physical layer. For example, the UL RS(s) may include the demodulation reference signal(s), the UE-specific reference signal(s), the sounding reference signal(s) (the SRS(s)) and/or the beam-specific reference signal(s). The demodulation reference signal(s) (i.e., DM-RS) may include the demodulation reference signal(s) associated with transmission of the uplink physical channel (e.g., the PUSCH and/or the PUCCH).

Also, the UE-specific reference signal(s) may include reference signal(s) associated with transmission of uplink physical channel (e.g., the PUSCH and/or the PUCCH). For example, the demodulation reference signal(s) and/or the UE-specific reference signal(s) may be a valid reference for demodulation of uplink physical channel only if the uplink physical channel transmission is associated with the corresponding antenna port. The gNB 160 may use the demodulation reference signal(s) and/or the UE-specific reference signal(s) to perform (re)configuration of the uplink physical channels. The sounding reference signal may be used to measure an uplink channel state.

Also, in the radio communication for downlink, DL RS(s) may be used as downlink physical signal(s). The downlink physical signal may not be used to transmit information that is provided from the higher layer, but is used by a physical layer. For example, the DL RS(s) may include the cell-specific reference signal(s), the UE-specific reference signal(s), the demodulation reference signal(s), and/or the channel state information reference signal(s) (the CSI-RS(s)). The UE-specific reference signal may include the UE-specific reference signal(s) associated with transmission of the downlink physical channel (e.g., the PDSCH and/or the PDCCH). Also, the demodulation reference signal(s) may include the demodulation reference signal(s) associated with transmission of the downlink physical channel (e.g., the PDSCH and/or the PDCCH). Also, the CSI-RS may include Non-zero power Channel State Information-Reference signal(s) (NZP CSI-RS), and/or Zero power Channel State Information-Reference signal (ZP CSI-RS).

Here, the downlink physical channel(s) and/or the downlink physical signal(s) described herein may be assumed to be included in a downlink signal (i.e., a DL signal(s)) in some implementations for the sake of simple descriptions. Also, the uplink physical channel(s) and/or the uplink physical signal(s) described herein may be assumed to be included in an uplink signal (i.e. an UL signal(s)) in some implementations for the sake of simple descriptions.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB scheduling module 194. The gNB scheduling module 194 may perform scheduling of downlink and/or uplink transmissions as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

FIG. 2 shows examples of multiple numerologies. As shown in FIG. 2, multiple numerologies (i.e., multiple subcarrier spacing) may be supported. For example, μ (e.g., a subcarrier space configuration) and a cyclic prefix (e.g., the μ and the cyclic prefix for a carrier bandwidth part) may be configured by higher layer parameters (i.e., a RRC message) for the downlink and/or the uplink. Here, 15 kHz may be a reference numerology. For example, an RE of the reference numerology may be defined with a subcarrier spacing of 15 kHz in a frequency domain and 2048Ts+CP length (e.g. 160 Ts or 144 Ts) in a time domain, where Ts denotes a baseband sampling time unit defined as 1/(15000*2048) seconds.

Also, a number of OFDM symbol(s) per slot ($N_{symb}^{slot}$) may be determined based on the μ (e.g., the subcarrier space configuration). Here, for example, a slot configuration 0 (i.e., the number of OFDM symbols per slot may be 14) and/or a slot configuration (i.e., the number of OFDM symbols per slot may be 7) may be defined.

Figure 3:
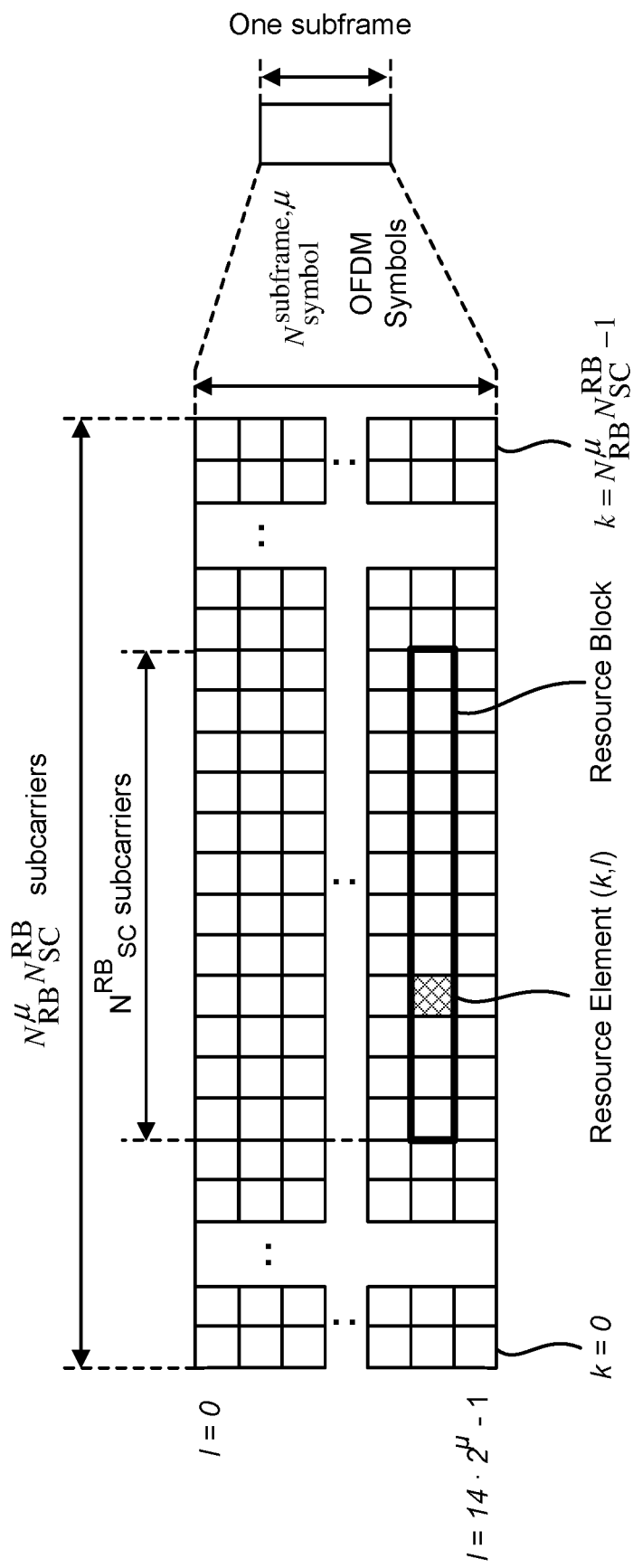
FIG. 3 is a diagram illustrating one example of a resource grid and resource block.

FIG. 3 is a diagram illustrating one example of a resource grid and resource block (e.g., for the downlink and/or the uplink). The resource grid illustrated in FIG. 3 may be utilized in some implementations of the systems and methods disclosed herein.

In FIG. 3, one subframe may include $N_{symbol}^{subframe,\mu}$ symbols. Also, a resource block may include a number of resource elements (RE). Here, in the downlink, the OFDM access scheme with cyclic prefix (CP) may be employed, which may be also referred to as CP-OFDM. A downlink radio frame may include multiple pairs of downlink resource blocks (RBs) which are also referred to as physical resource blocks (PRBs). The downlink RB pair is a unit for assigning downlink radio resources, defined by a predetermined bandwidth (RB bandwidth) and a time slot. The downlink RB pair may include two downlink RBs that are continuous in the time domain. And, the downlink RB may include twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l), where k and l are indices in the frequency and time domains, respectively.

Also, in the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). An uplink radio frame may include multiple pairs of uplink resource blocks. The uplink RB pair is a unit for assigning uplink radio resources, defined by a predetermined bandwidth (RB bandwidth) and a time slot. The uplink RB pair may include two uplink RBs that are continuous in the time domain. The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a resource element (RE) and is uniquely identified by the index pair (k, l) in a slot, where k and l are indices in the frequency and time domains respectively.

Each element in the resource grid (e.g., antenna port p) and the subcarrier configuration μ is called a resource element and is uniquely identified by the index pair (k,l) where k=0, ..., $N_{RB}^{\mu}N_{SC}^{RB}-1$ is the index in the frequency domain and l refers to the symbol position in the time domain. The resource element (k,l) on the antenna port p and the subcarrier spacing configuration μ is denoted $(k,l)_{p,\mu}$. The physical resource block is defined as $N_{SC}^{RB}=12$ consecutive subcarriers in the frequency domain. The physical resource blocks are numbered from 0 to $N_{RB}^{\mu}-1$ in the frequency domain. The relation between the physical resource block number $n_{PRB}$ in the frequency domain and the resource element (k,l) is given by $$n_{PRB} = \left\lfloor \frac{k}{N_{SC}^{RB}} \right\rfloor.$$

Figure 4:
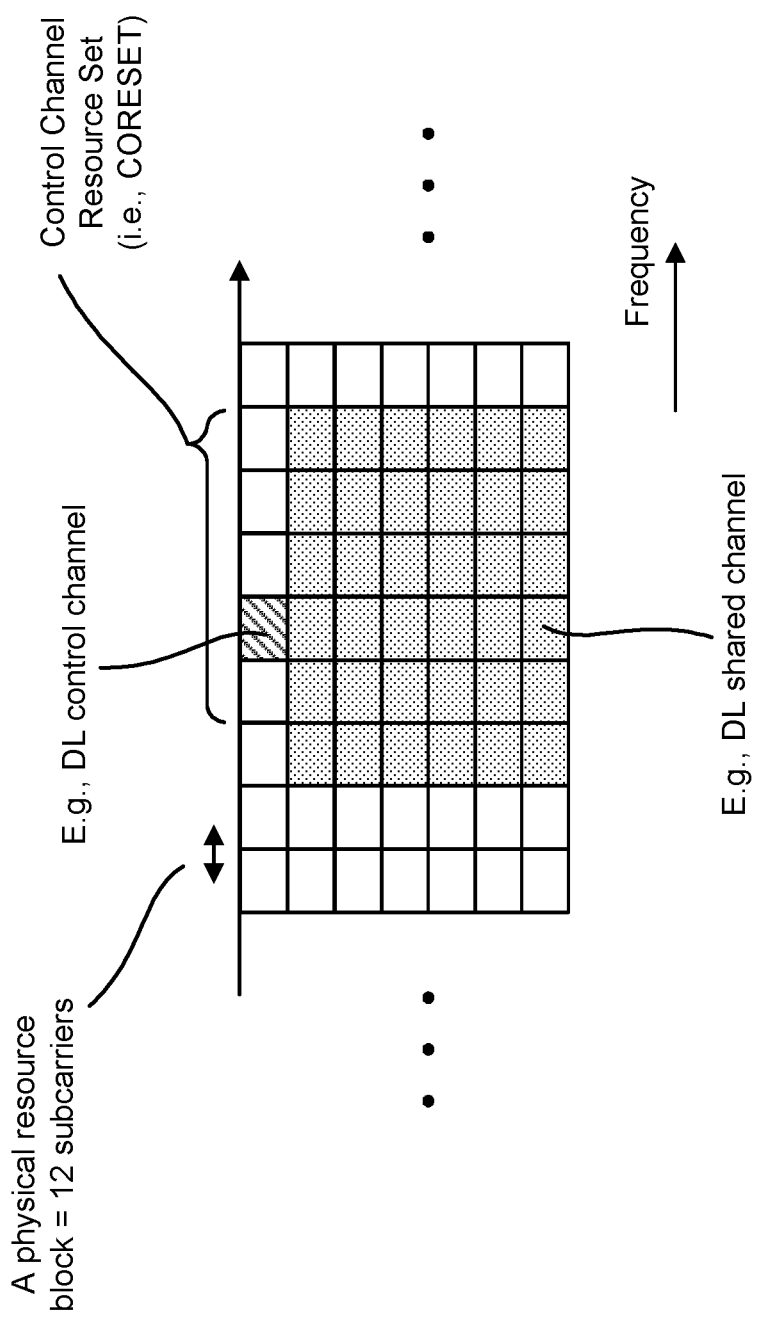
FIG. 4 shows examples of resource regions.

FIG. 4 shows examples of resource regions (e.g., resource region of the downlink). Here, the DCI format(s) may include the DCI format(s) for the downlink and/or the DCI format(s) for the uplink. One or more sets of PRB(s) (e.g., a control resource set (e.g., CORESET)) may be configured for DL control channel monitoring (e.g., the PDCCH monitoring). For example, the control resource set (e.g., the CORESET) is, in the frequency domain and/or the time domain, a set of PRBs within which the UE 102 attempts to decode the DCI (e.g., the DCI format(s), the PDCCH(s)), where the PRBs may or may not be frequency contiguous and/or time contiguous, a UE 102 may be configured with one or more control resource sets (i.e., the CORESETs) and one DCI message may be mapped within one control resource set. In the frequency-domain, a PRB is the resource unit size (which may or may not include DM-RS) for the DL control channel.

The UE 102 may monitor a set of candidates of the DL control channel(s) in the control resource set (e.g., the CORESET). Here, the candidates of DL control channel (s) may be candidates for which the DL control channel(s) may possibly be mapped, assigned, and/or transmitted. For example, a candidate of the DL control channel(s) is composed of one or more control channel elements (CCEs). Here, the term "monitor" means that the UE 102 attempts to decode each DL control channel(s) in the set of candidates of the DL control channel(s) in accordance with all the DCI format(s) to be monitored.

The set of candidates of the DL control channel(s) (e.g., the PDCCH(s), the PDCCH candidates, the CORESET) that the UE 102 monitors may be also referred to as a search space(s). That is, the search space(s) is a set of resource (e.g., CORESET) that may possibly be used for transmission of the DL control channel(s). The UE 102 may monitor the set of candidates of the DL control channel(s) according to the search space(s) where monitoring implies attempting to detect each DL control channel(s) candidate according to the monitored DCI formats.

Here, the common search space (the CSS, the UE-common search space) and/or the user-equipment search space (the USS, the UE-specific search space) are defined (or set, configured) in a region(s) of DL control channel(s) (e.g., the DL control channel monitoring regions, CORESET). For example, the CSS may be used for transmission of DCI to a plurality of the UEs 102. That is, the CSS may be defined by a resource common to a plurality of the UEs 102. Here, the CSS may be used for transmission of DCI to a specific UE 102. That is, the gNB 160 may transmit, in the CSS, DCI format(s) intended for a plurality of the UEs 102 and/or DCI format(s) intended for a specific UE 102.

Also, the USS may be used for transmission of DCI to a specific UE 102. That is, the USS is defined by a resource dedicated to a certain UE 102. The USS may be defined independently for each UE 102. For example, the USS may be composed of CCEs having numbers that are determined based on a Radio Network Temporary Identifier (RNTI) (e.g., the C-RNTI), a slot number in a radio frame, an aggregation level, and/or the like. The RNTI(s) may be assigned by the gNB 160. Namely, each of the USSs corresponding to each of the RNTI(s) described below may be defined. For example, the USS may be defined for the DCI format(s) with the CRC scrambled by the C-RNTI and/or the CS-RNTI.

Here, the gNB 160 may transmit, by using the RRC message, information used for configuring one or more control resource sets (i.e., one or more CORESETs). Here, the information used for configuring the one or more CORESETs may be configured for each of downlink BWP(s) in a serving cell. Also, for each CORESET, the gNB 160 may transmit, by using the RRC message, information used for indicating that the search space is the CSS or the USS. Namely, the information used for indicating that the search space is the CSS or the USS may be configured for each of downlink BWP(s) in a serving cell. Also, for the CSSI and/or the USS, the gNB 160 may transmit, by using the RRC message, information used for indicating to monitor the PDCCH for the DCI format 0_0 and/or the DCI format 1_0. Here, the information used for indicating to monitor the PDCCH for the DCI format 0_0 and/or the DCI format 1_0 may be configured for each of downlink BWP(s) in a serving cell. Also, for the CSSI and/or the USS, the gNB 160 may transmit, by using the RRC message, information used for indicating to monitor the PDCCH for the DCI format 0_0 and the DCI format 1_0, or the DCI format 0_1 and the DCI format 1_1. Here, the information used for indicating to monitor the PDCCH for the DCI format 0_0 and the DCI format 1_0, or the DCI format 0_1 and the DCI format 1_1 may be configured for each of the downlink BWP(s) in a serving cell.

Also, for the CSS and/or the USS, the gNB 160 may transmit, by using the RRC message, information used for indicating one or more periodicities (e.g., one or more periodicities of a subframe(s), a slot(s), and/or a symbol(s)) for PDCCH monitoring. Also, for the CSSI and/or the USS, the gNB 160 may transmit, by using the RRC message, information used for indicating one or more offsets (e.g., one or more offsets of a subframe(s), a slot(s), and/or a symbol(s)) for PDCCH monitoring. And, a monitoring occasion(s) may be defined, at least, based on the one or more periodicities of the PDCCH monitoring, and/or the one or more offsets of the PDCCH monitoring. Namely, the UE 102 may determine the PDCCH occasion(s) based on the one or more periodicities of the PDCCH monitoring, and/or the one or more offsets of the PDCCH monitoring. For example, the UE 102 may determine, based on the one or more periodicities of the PDCCH monitoring, and/or the one or more offsets of the PDCCH monitoring, the PDCCH occasion(s) for the CSS and/or the USS (e.g., the CSS for the DCI format 0_0 and/or the DCI format 1_0, the USS for the DCI format 0_0, the DCI format 1_0, the DCI format 0_1, and/or the DCI format 1_1).

As described above, the DCI format 1_0 that is used for scheduling of the PDSCH in the cell may be defined as the DCI format for the downlink. Here, the DCI format 1_0 described herein may be assumed to be included in a DCI format A in some implementations for the sake of simplifying description. Also, the C-RNTI, the CS-RNTI, the P-RNTI, the SI-RNTI, and/or the RA-RNTI may be used to transmit the DCI format A. Also, the DCI format A may be monitored (e.g., transmitted, mapped) in the CSS and/or the USS. Alternatively, the DCI format A may be monitored (e.g., transmitted, mapped) in the CSS only.

For example, the DCI format A (e.g., the DCI format A with the CRC scrambled by the C-RNTI) may be used for transmitting downlink control information (e.g., DCI). For example, the DCI included in the DCI format A may be an identifier for the DCI format(s). Also, the DCI included in the DCI format A may be a frequency domain resource assignment (e.g., for the PDSCH). Also, the DCI included in the DCI format A may be a time domain resource assignment (e.g., for the PDSCH). Also, the DCI included in the DCI format A may be a modulation and coding scheme (e.g., for the PDSCH). Also, the DCI included in the DCI format A may be a new data indicator. Also, the DCI included in the DCI format A may be HARQ process number. Also, the DCI included in the DCI format A may be a downlink assignment index. Also, the DCI included in the DCI format A may be a TPC (e.g., Transmission Power Control) command for scheduled PUCCH. Also, the DCI included in the DCI format A may be a PUCCH resource indicator. Also, the DCI included in the DCI format A may be a timing indicator (e.g., a timing indicator for HARQ transmission for the PDSCH reception).

Also, the DCI format 1_1 that is used for scheduling of the PDSCH in the cell may be defined as the DCI format for the downlink. Here, the DCI format 1_1 described herein may be assumed to be included in a DCI format B in some implementations for the sake of simplifying description. Also, the C-RNTI, the CS-RNTI, and/or the SP-CSI C-RNTI may be used to transmit the DCI format B. Also, the DCI format B may be monitored (e.g., transmitted, mapped) in the CSS and/or the USS.

For example, the DCI format B (e.g., the DCI format B with the CRC scrambled by the C-RNTI) may be used for transmitting downlink control information (e.g., DCI). For example, the DCI included in the DCI format B may be a carrier indicator. Also, the DCI included in the DCI format B may be an identifier for the DCI format(s). Also, the DCI included in the DCI format B may be a BWP indicator (e.g., for the PDSCH). Also, the DCI included in the DCI format B may be frequency domain resource assignment (e.g., for the PDSCH). Also, the DCI included in the DCI format B may be a time domain resource assignment (e.g., for the PDSCH). Also, the DCI included in the DCI format B may be a modulation and coding scheme (e.g., for the PDSCH). Also, the DCI included in the DCI format B may be a new data indicator. Also, the DCI included in the DCI format B may be a HARQ process number. Also, the DCI included in the DCI format B may be a downlink assignment index.

Also, the DCI included in the DCI format B may be a TPC command for scheduled PUCCH. Also, the DCI included in the DCI format B may be a PUCCH resource indicator. Also, the DCI included in the DCI format B may be a timing indicator (e.g., a timing indicator for HARQ transmission for the PDSCH reception). Also, the DCI included in the DCI format B may be a SRS request that is used for requesting (e.g., triggering) transmission of the SRS. Also, the DCI included in the DCI format B may be a CBG (e.g., code block group) transmission information (e.g., for the PDSCH). Also, the DCI included in the DCI format B may be CBF flushing out information (e.g., for the PDSCH). Also, the DCI included in the DCI format B may be a CSI request that is used for requesting (e.g., triggering) transmission of the CSI.

And, in a case that the DCI format A is received (i.e., based on the detection of the DCI format A), the UE 102 may receive (i.e., decode, detect) the scheduled PDSCH. Also, in a case that the DCI format B is received (i.e., based on the detection of the DCI format B), the UE 102 may receive (i.e., decode, detect) the scheduled PDSCH.

Also, the DCI format 0_0 that is used for scheduling of the PUSCH in the cell may be defined as the DCI format for the uplink. Here, the DCI format 0_0 described herein may be assumed to be included in a DCI format C in some implementations for the sake of simplifying description. Also, the C-RNTI, the CS-RNTI, and/or the Temporary C-RNTI may be used to transmit the DCI format C. Also, the DCI format C may be monitored (e.g., transmitted, mapped) in the CSS and/or the USS. Alternatively, the DCI format C may be monitored (e.g., transmitted, mapped) in the CSS only.

For example, the DCI format C (e.g., the DCI format C with the CRC scrambled by the C-RNTI) may be used for transmitting downlink control information (e.g., DCI). For example, the DCI included in the DCI format C may be an identifier for the DCI format(s). Also, the DCI included in the DCI format C may be a frequency domain resource assignment (e.g., for the PUSCH). Also, the DCI included in the DCI format C may be a time domain resource assignment (e.g., for the PUSCH). Also, the DCI included in the DCI format C may be a modulation and coding scheme (e.g., for the PUSCH). Also, the DCI included in the DCI format C may be a new data indicator. Also, the DCI included in the DCI format C may be a HARQ process number. Also, the DCI included in the DCI format C may be a redundancy version. Also, the DCI included in the DCI format C may be a TPC command for scheduled PUSCH. Also, the DCI included in the DCI format C may be a UL/SUL (e.g., Supplemental Uplink) indicator. Here, as described below, the DCI format C may be used for activating and/or deactivating (releasing) the configured grant (e.g., the configured grant Type 2). Also, the DCI format C may be used for activating and/or deactivating (releasing) the SP-CSI reporting.

Also, a DCI format 0_1 that is used for scheduling of the PUSCH in the cell may be defined as the DCI format for the uplink. Here, the DCI format 0_1 described herein may be assumed to be included in a DCI format D in some implementations for the sake of simplifying description. Also, the C-RNTI, the CS-RNTI, and/or the SP-CSI C-RNTI may be used to transmit the DCI format D. Also, the DCI format D may be monitored (e.g., transmitted, mapped) in the CSS and/or the USS.

For example, the DCI format D (e.g., the DCI format D with the CRC scrambled by the C-RNTI) may be used for transmitting downlink control information (e.g., DCI). For example, the DCI included in the DCI format D may be a carrier indicator. Also, the DCI included in the DCI format D may be a UL/SUL indicator. Also, the DCI included in the DCI format D may be an identifier for the DCI format(s). Also, the DCI included in the DCI format D may be a BWP indicator (e.g., for the PUSCH). Also, the DCI included in the DCI format D may be a frequency domain resource assignment (e.g., for the PUSCH). Also, the DCI included in the DCI format D may be a time domain resource assignment (e.g., for the PUSCH). Also, the DCI included in the DCI format D may be a modulation and coding scheme (e.g., for the PUSCH). Also, the DCI included in the DCI format D may be a new data indicator. Also, the DCI included in the DCI format D may be a HARQ process number. Also, the DCI included in the DCI format D may be a downlink assignment index. Also, the DCI included in the DCI format D may be a TPC command for scheduled PUSCH. Also, the DCI included in the DCI format D may be a PUCCH resource indicator. Also, the DCI included in the DCI format D may be a SRS request that is used for requesting (e.g., triggering) transmission of the SRS. Also, the DCI included in the DCI format D may be CBG (e.g., code block group) transmission information. Also, the DCI included in the DCI format D may be CBF flushing out information. Also, the DCI included in the DCI format D may be a CSI request that is used for requesting (e.g., triggering) transmission of the CSI. Here, as described below, the DCI format D may be used for activating and/or deactivating (releasing) the configured grant (e.g., the configured grant Type 2). Also, the DCI format D may be used for activating and/or deactivating (releasing) the SP-CSI reporting.

And, in a case that the DCI format C is received (i.e., based on the detection of the DCI format C), the UE 102 may perform the PUSCH transmission. Also, in a case that the DCI format D is received (i.e., based on the detection of the DCI format D), the UE 102 may perform the PUSCH transmission.

Here, as described above, the random access procedure may include the contention based random access procedure and/or the non-contention based random access procedure. For example, the contention based random access procedure may include a 4-step procedure. Also, the non-contention based random access procedure may include a 2-step procedure.

For example, in the contention based random access procedure, the UE 102 may transmit the random access preamble (e.g., Msg. 1) using the PRACH occasion(s). Here, the PRACH occasion(s) may be time domain resources and/or the frequency domain resources on which the random access preamble is transmitted (e.g., using the configured random access preamble format(s)). Also, the random access preamble(s) may be identified by using one or more random access preamble identifiers.

Also, in random access response reception (e.g., in the contention based random access procedure), the UE 102 may receive the random access response (e.g., Msg. 2). For example, once the random access preamble is transmitted, the UE 102 may monitor, in the RA Response window, the PDCCH for the random access response(s) identified by the RA-RNTI. Namely, the UE 102 may receive the random access response on the DL-SCH (e.g., the PDSCH) that is scheduled by using the PDCCH with the CRC scrambled by the RA-RNTI. And, the UE 102 may stop monitoring for the random access response(s) after successful reception of the random access response containing the one or more random access preambles identifiers that match the transmitted random access preamble.

Namely, the random access response may contain the one or more random access preamble identifiers. Also, the random access response may include a Timing Advance command. Also, the random access response may include the random access response grant. As described above, the PUSCH transmission (e.g., the UL-SCH transmission, Msg. 3 transmission) may be scheduled by using the random access response grant. For example, an initial transmission (e.g., a new transmission) of the PUSCH (e.g., the UL-SCH, Msg. 3) may be scheduled by using the random access response grant. Also, the random access response may contain the Temporary C-RNTI. For example, the PUSCH transmission (e.g., the UL SCH transmission, Msg. 3 transmission) may be scheduled by using the PDCCH (e.g., the DCI format(s) for the uplink) with the CRC scrambled by the Temporary C-RNTI. For example, retransmission of the PUSCH (e.g., retransmission of the same transport block, the UL-SCH, Msg.3) may be scheduled by using the PDCCH with the CRC scrambled by the Temporary C-RNTI.

Also, in scheduled transmission (e.g., in the contention based random access procedure), the UE 102 may perform a timing adjustment for the uplink transmission based on the Timing Advance command. Also, the UE 102 may perform the PUSCH transmission (e.g., the UL-SCH transmission, Msg.3 transmission) based on the random access response grant. Here, the Msg.3 transmission may include an identity used for identifying the UE 102 (Initial UE-Identity or the C-RNTI). As described above, the UE 102 may perform the initial transmission (e.g., the new transmission) of the PUSCH (e.g., the UL-SCH, Msg. 3) that may be scheduled by using the random access response grant. Also, the UE 102 may perform the retransmission of the PUSCH (e.g., retransmission of the same transport block, the UL-SCH, Msg.3) that may be scheduled by using the PDCCH with the CRC scrambled by the Temporary C-RNTI.

Also, in contention resolution (e.g., in the contention based random access procedure), in a case that a contention resolution identity received from the gNB 160 is matched to the Initial UE-Identity, the UE 102 may consider the contention resolution successful. Also, in a case that the PDCCH with the CRC scrambled by the C-RNTI is received, the UE 102 may consider the contention resolution successful. Then, the UE 102 may consider the random access procedure successfully completed.

FIG. 5 shows examples of DCI for activation. As described above, the DCI format C and/or the DCI format D may be used for activating and/or deactivating the configured grant (e.g., the configured grant Type 2). Also, the DCI format C and/or the DCI format D may be used for activating and/or deactivating the SP-CSI reporting (e.g., the SP-CSI reporting on the PUSCH).

Here, for example, transmission of the PUSCH with a dynamic grant (e.g., the dynamic scheduling used by the DCI format C and/or the DCI format D) may be supported. Also, transmission of the PUSCH without the dynamic grant may be supported. For example, there may be two types of the transmission without the dynamic grant. For example, one of the two types of the transmission without the dynamic grant may be a configured grant Type 1 (e.g., a Type 1). Also, one of the two types of the transmission without the dynamic grant may be the configured grant Type 2 (e.g., the Type 2).

Here, for the configured grant Type 1, an uplink grant may be provided by RRC (e.g., RRC layer). Namely, for example, in a case that the UE 102 receives the RRC message including configuration(s) (e.g., the uplink grant) for the configured grant Type 1 (e.g., information used for configuring a parameter(s) for the configured grant Type 1), the UE 102 may store the uplink grant as a configured grant. Namely, the uplink grant provided by the RRC may be stored as the configured grant.

Also, for the configured grant Type 2, an uplink grant may be provided by the PDCCH (e.g., the DCI format(s) for the uplink (e.g., the DCI format C and/or the DCI format D)). Namely, for example, in a case that the UE 102 receives the DCI format(s) for the uplink on the PDCCH (i.e., the uplink grant, an uplink grant activation, and/or a configured grant activation), the UE 102 may store the uplink grant as the configured grant. Also, in a case that the UE 102 receives the DCI format(s) for the uplink on the PDCCH (i.e., the uplink grant, an uplink grant deactivation, and/or a configured grant deactivation), the UE 102 clear the uplink grant (e.g., clear the configured grant). Namely, the uplink grant provided by the PDCCH may be stored or cleared as the configured grant based on the DCI format(s) for the uplink, which is used for activating and/or deactivating (releasing) the configured grant.

Namely, for the configured grant Type 2, the DCI format(s) used for indicating the activation (e.g., the configured grant activation) and/or the deactivation (e.g., the configured grant deactivation) may be defined. Here, for example, the DCI format(s) used for indicating the activation and/or the deactivation may be identified by the CS-RNTI. Namely, for example, in a case that the DCI format(s) for the uplink with the CRC scrambled by the CS-RNTI is received, the UE 102 may validate the configured grant scheduling. Also, the DCI format(s) used for indicating the activation (e.g., the configured grant activation) and/or the deactivation (e.g., the configured grant deactivation) may be identified by setting each of one or more fields (i.e., one or more predetermined fields, one or more special fields) included in the DCI format(s) for the uplink (e.g., the DCI format C and/or the DCI format D) to each of certain values (i.e., one or more predetermined values). Also, the DCI format(s) used for indicating the activation (e.g., the configured grant activation) and/or the deactivation (e.g., the configured grant deactivation) may be identified by setting each of one or more fields (i.e., one or more predetermined fields) included in the DCI format(s) for the uplink to each of certain values (i.e., one or more predetermined values).

For example, as described in FIG. 5, by setting the TPC command for scheduled PUSCH, the HARQ process number, the modulation and coding scheme, the redundancy version and/or the new data indicator to each of certain values, the DCI format(s) used for indicating the activation (e.g., the configured grant activation) may be identified. Also, by setting the TPC command for scheduled PUSCH, the HARQ process number, the resource block assignment (e.g., the frequency domain resource assignment and/or the time domain resource assignment), the modulation and coding scheme, the redundancy version and/or the new data indicator to each of certain values, the DCI format(s) used for indicating the deactivation (e.g., the configured grant deactivation) may be identified.

Also, for example, Semi-Persistent CSI (e.g., SP-CSI) reporting on the PUSCH may be supported. For example, the gNB 160 may transmit, by using the RRC message, information used for configuring a set(s) of the SP-CSI report setting (e.g., parameters used for the SP-CSI reporting on the PUSCH). Here, the set(s) of the SP-CSI report setting may include a periodicity and/or an offset value (i.e., the time domain resources) for the SP-CSI reporting on the PUSCH. And, the CSI request field(s) (e.g., a value(s) set to the CSI request field(s)) included in the DCI format(s) for the uplink (e.g., the DCI format(s) for the uplink with the CRC scrambled by the SP-CSI C-RNTI) may be used for indicating the set(s) of the SP-CSI report setting. Namely, the CSI request field(s) (e.g., a value(s) set to the CSI request field(s)) included in the DCI format(s) for the uplink (e.g., the DCI format(s) for the uplink with the CRC scrambled by the SP-CSI C-RNTI) may be used for indicating the SP-CSI reporting based on the set(s) of the SP-CSI report setting.

For example, the UE 102 may perform the SP-CSI reporting on the PUSCH based on decoding of the DCI format(s) for the uplink (e.g., the DCI format(s) used for indicating the activation of the SP-CSI reporting on the PUSCH). Also, the UE 102 may deactivate (e.g., release) the SP-CSI reporting on the PUSCH based on decoding of the DCI format(s) for the uplink (e.g., the DCI format(s) used for indicating the deactivation of the SP-CSI reporting on the PUSCH). Here, the frequency domain resources for the SP-CSI reporting on the PUSCH may be indicated by the DCI format(s) for the uplink with the CRC scrambled by the SP-CSI C-RNTI. Also, the modulation and coding scheme for the SP-CSI reporting on the PUSCH may be indicated by the DCI format(s) for the uplink with the CRC scrambled by the SP-CSI C-RNTI.

Also, the SP-CSI reporting on the PUSCH (e.g., the CSI reporting on the PUSCH) may be multiplexed with the uplink data (i.e., the UL-SCH, the UL-SCH data) on the PUSCH. Namely, the SP-CSI (e.g., the SP-CSI reporting on the PUSCH) may be transmitted on the PUSCH together with the uplink data. Also, the SP-CSI reporting on the PUSCH may be performed without any multiplexing with the uplink data. Namely, the SP-CSI may be transmitted on the PUSCH without the uplink data. Namely, only the SP-CSI may be transmitted on the PUSCH. Namely, the UE 102 may transmit on the PUSCH, the SP-CSI together with the uplink data. Also, the UE 102 may transmit on the PUSCH, the SP-CSI without the uplink data (e.g., the UE 102 may transmit on the PUSCH, the SP-CSI only).

Namely, for the SP-CSI reporting on the PUSCH, the DCI format(s) used for indicating the activation (e.g., the activation of the SP-CSI reporting on the PUSCH) and/or the deactivation (e.g., the deactivation of the SP-CSI reporting on the PUSCH) may be defined. Here, for example, the DCI format(s) used for indicating the activation and/or the deactivation may be identified by the SP-CSI C-RNTI. Namely, for example, in a case that the DCI format(s) for the uplink with the CRC scrambled by the SP-CSI C-RNTI is received, the UE 102 may validate the SP-CSI reporting on the PUSCH. Also, the DCI format(s) used for indicating the activation (e.g., the activation of the SP-CSI reporting on the PUSCH) and/or the deactivation (e.g., the deactivation of the SP-CSI reporting on the PUSCH) may be identified by setting each of one or more fields (i.e., one or more predetermined fields, one or more special fields) included in the DCI format(s) for the uplink to each of certain values (i.e., one or more predetermined values). Also, the DCI format(s) used for indicating the activation (e.g., the activation of the SP-CSI reporting on the PUSCH) and/or the deactivation (e.g., the deactivation of the SP-CSI reporting on the PUSCH) may be identified by setting each of one or more fields (i.e., one or more predetermined fields, one or more special fields) included in the DCI format(s) for the uplink to each of certain values (i.e., one or more predetermined values).

For example, as described in FIG. 5, by setting the TPC command for scheduled PUSCH, the HARQ process number, the modulation and coding scheme, the redundancy version and/or the new data indicator to each of certain values, the DCI format(s) used for indicating the activation (e.g., the activation of the SP-CSI reporting on the PUSCH) may be identified. Also, by setting the TPC command for scheduled PUSCH, the HARQ process number, the modulation and coding scheme, the resource block assignment (e.g., the frequency domain resource assignment and/or the time domain resource assignment), the redundancy version, the new data indicator, and/or the CSI request field(s) to each of certain values, the DCI format(s) used for indicating the deactivation (e.g., the deactivation of the SP-CSI reporting on the PUSCH) may be identified.

Here, the information field(s) and/or the value(s) set to the information described in FIG. 5 may be one example. And, which information field(s) (i.e., the predetermined field(s)) included in the DCI format(s) for the uplink is used for identifying the DCI format(s) used for indicating the activation (e.g., the configured grant activation and/or the activation of the SP-CSI reporting on the PUSCH) and/or the deactivation (e.g., the configured grant deactivation and/or the deactivation of the SP-CSI reporting on the PUSCH) may be specified, in advance, by a specification, and known (e.g., stored) information between the gNB 160 and the UE 102. Also, which value(s) set to the predetermined field(s) for identifying the DCI format(s) for the uplink is used for identifying the DCI format(s) used for indicating the activation (e.g., the configured grant activation and/or the activation of the SP-CSI reporting on the PUSCH) and/or the deactivation (e.g., the configured grant deactivation and/or the deactivation of the SP-CSI reporting on the PUSCH) may be specified, in advance, by a specification, and known (e.g., stored) information between the gNB 160 and the UE 102.

Figure 6:
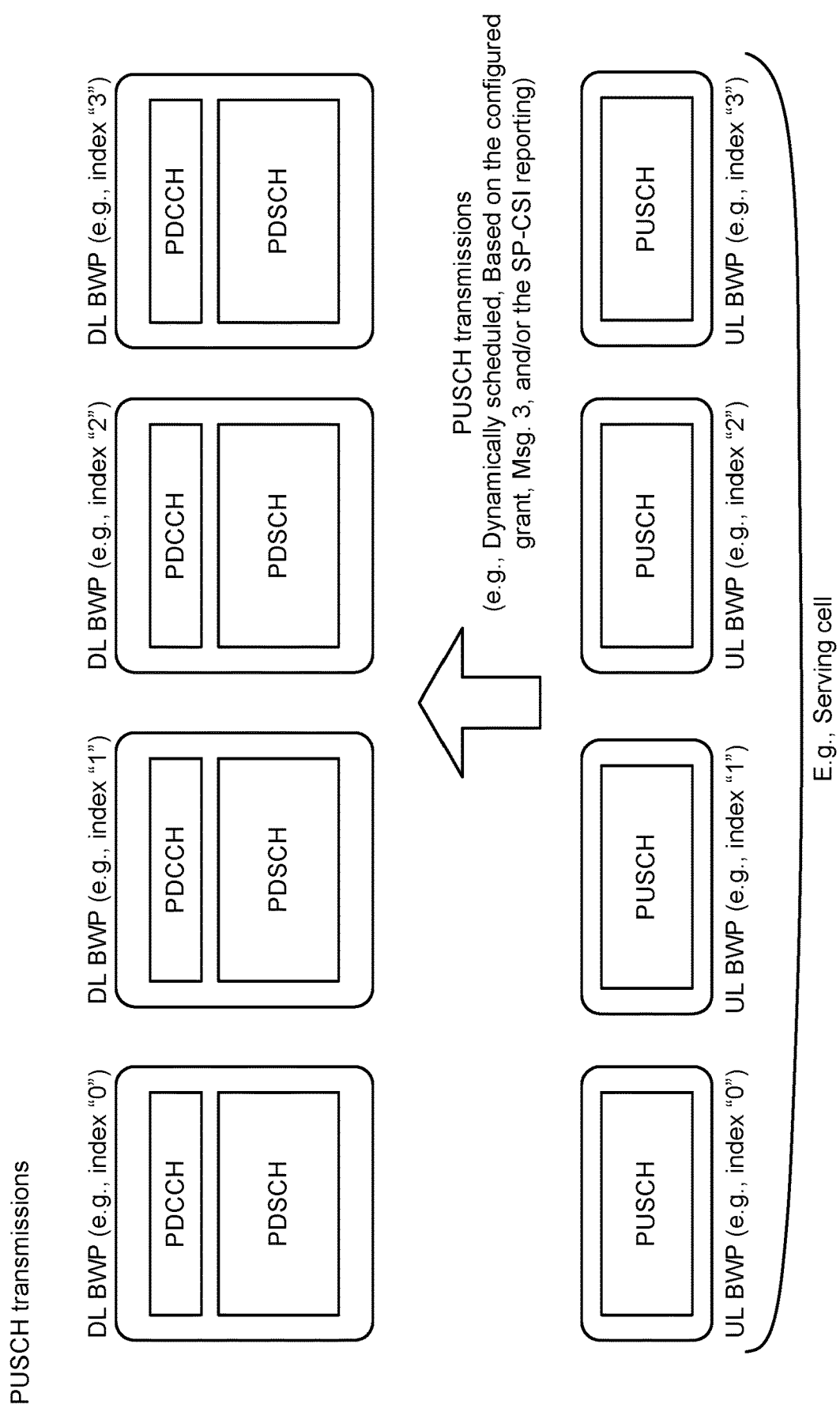
FIG. 6 illustrates an example of the physical uplink shared channel (PUSCH) transmissions.

FIG. 6 illustrates an example of the PUSCH transmissions. Here, for example, for the serving cell(s), the gNB 160 may transmit, by using the RRC message, information used for configuring a set of four DL BWPs (e.g., at most four DL BWPs, a DL BWP set) (e.g., for reception by the UE 102). Also, for the serving cell(s), the gNB 160 may transmit, by using the RRC message, information used for configuring a set of four UL BWP(s) (e.g., at most four UL BWPs, a UL BWP set). Also, for each DL BWP in the set of DL BWPs, the gNB 160 may configure, by using the RRC message, the subcarrier spacing, the cyclic prefix, a number of contiguous PRBs (e.g., a bandwidth of PRBs), and/or an index (e.g., the index of the DL BWP(s), the DL BWP ID) in the set of DL BWPs. Also, for each UL BWP in the set of UL BWPs, the gNB 160 may configure, by using the RRC message, the subcarrier spacing, the cyclic prefix, a number of contiguous PRBs (e.g., a bandwidth of PRBs), and/or an index (e.g., the index of the UL BWP(s), the UL BWP ID) in the set of UL BWPs. Also, for each DL BWP or UL BWP in the set of DL BWPs or UL BWPs, respectively, the gNB 160 may configure, by using the RRC message, a link (e.g., a linking, a pairing, a correspondence, and/or a mapping) between the DL BWP and the UL BWP from the set of configured DL BWP(s) and UL BWP(s). For example, the gNB 160 may configure BWP(s) per serving cell for the uplink (e.g., if the serving cell is configured with the uplink) and for the downlink.

Here, the BWP indicator field(s) (e.g., a value(s) of the BWP indicator field(s)) included in the DCI format(s) for the downlink (e.g., the DCI format 1_1) may be used for indicating the active DL BWP(s), from the configured set of the DL BWP(s), for downlink reception(s) (e.g., the reception(s) on the PDCCH, and/or the reception(s) on the PDSCH). Also, the BWP indicator field(s) (e.g., a value(s) of the BWP indicator field(s)) included in the DCI format(s) for the uplink (e.g., the DCI format 0_1) may be used for indicating the active UL BWP(s), from the configured set of the UL BWP(s), for uplink transmission(s) (e.g., the transmission(s) on the PUCCH, and/or the transmission(s) on the PUSCH).

And, the UE 102 may perform, based on the configuration(s) for the DL BWP(s), reception(s) on the PDCCH in the DL BWP(s) and/or reception(s) on the PDSCH in the DL BWP(s). For example, the UE 102 may perform, based on the configured subcarrier spacing and cyclic prefix (e.g., the cyclic prefix length) for the DL BWP(s), the reception(s) on the PDCCH in the DL BWP(s) and/or the reception(s) on the PDSCH in the DL BWP(s). Also, the UE 102 may perform, based on the configuration(s) for the UL BWP(s), transmission(s) on the PUCCH in the UL BWP(s) and/or transmission(s) on the PUSCH in the UL BWP(s). For example, the UE 102 may perform, based on the configured subcarrier spacing and cyclic prefix (e.g., the cyclic prefix length) for the UL BWP(s), the transmission(s) on the PUCCH in the UL BWP(s) and/or the transmission(s) on the PUSCH in the UL BWP(s).

Also, for example, one or more serving cells may be configured to the UE 102. Namely, in the carrier aggregation (CA), the gNB 160 and the UE 102 may communicate with each other using the one more serving cells. Here, the configured one or more serving cells may include one primary cell and one or more secondary cell. For example, the primary cell may be a serving cell on which an initial connection establishment procedure (e.g., the random access procedure) is performed. Also, the primary cell may be a serving cell on which a connection re-establishment procedure is performed. Also, the primary cell may be a serving cell that is indicated as the primary cell (e.g., indicated as the primary cell during the handover procedure). For example, the gNB 160 may transmit, by using the RRC message, information used for configuring the primary cell. Also, the gNB 160 may transmit, by using the RRC message, information used for configuring one or more secondary cells to form together with the primary cell a set of serving cells. Here, in the downlink, a carrier corresponding to the primary cell may be the downlink primary component carrier (i.e., the DL PCC), and a carrier corresponding to a secondary cell may be the downlink secondary component carrier (i.e., the DL SCC). Also, in the uplink, a carrier corresponding to the primary cell may be the uplink primary component carrier (i.e., the UL PCC), and a carrier corresponding to the secondary cell may be the uplink secondary component carrier (i.e., the UL SCC).

As described above, the UE 102 may perform the SP-CSI reporting on the PUSCH scheduled by using the DCI format(s) for the uplink with the CRC scrambled by using the SP-CSI C-RNTI. For example, the UE 102 may perform the SP-CSI reporting on the PUSCH, which is activated by using the DCI format(s) for the uplink with the CRC scrambled by using the SP-CSI C-RNTI. Here, the SP-CSI reporting on the PUSCH scheduled (e.g., activated) by using the DCI format(s) for the uplink with the CRC scrambled by the SP-CSI C-RNTI described herein may be assumed to be included in a first PUSCH transmission. Also, the PUSCH (e.g., the PUSCH resources indicated by the DCI format(s) for the uplink with the CRC scrambled by the SP-CSI C-RNTI) used for the first transmission described herein may be assumed to be included in a first PUSCH.

Also, the UE 102 may perform the PUSCH transmission (e.g., the UL-SCH transmission) scheduled (e.g., dynamically) by using the DCI format(s) for the uplink with the CRC scrambled by the C-RNTI (e.g., the DCI format D and/or the DCI format E with the CRC scrambled by the C-RNTI). Here, the PUSCH transmission scheduled by using the DCI format(s) for the uplink with the CRC scrambled by the C-RNTI described herein may be assumed to be included in a second PUSCH transmission. Also, the PUSCH (e.g., the PUSCH resources indicated by the DCI format(s) for the uplink with the CRC scrambled by the C-RNTI) used for the second transmission described herein may be assumed to be included in a second PUSCH.

Also, the UE 102 may perform the PUSCH transmission (e.g., the UL-SCH transmission, the PUSCH transmission based on the configured grant) scheduled (e.g., activated) by using the DCI format(s) for the uplink with the CRC scrambled by the CS-RNTI (e.g., the DCI format D and/or the DCI format E with the CRC scrambled by the CS-RNTI). Here, the PUSCH transmission scheduled (e.g., activated) by using the DCI format(s) for the uplink with the CRC scrambled by the CS-RNTI described herein may be assumed to be included in a third PUSCH transmission. Also, the PUSCH (e.g., the PUSCH resources indicated by the DCI format(s) for the uplink with the CRC scrambled by the CS-RNTI) used for the third transmission described herein may be assumed to be included in a third PUSCH.

Also, the UE 102 may perform the PUSCH transmission (e.g., the UL-SCH transmission, Msg.3 transmission) scheduled by using the random access response grant. Namely, the UE 102 may perform the PUSCH transmission (e.g., the UL-SCH transmission, Msg.3 transmission, the initial transmission of the PUSCH) which corresponds to the random access response grant, in the random access procedure (e.g., in the contention based random access procedure). Also, the UE 102 may perform the PUSCH transmission (e.g., the UL-SCH transmission, Msg.3 transmission) scheduled by using the DCI format(s) for the uplink with the CRC scrambled by the Temporary C-RNTI. Namely, the UE 102 may perform the PUSCH transmission (e.g., the UL-SCH transmission, Msg.3 transmission, the retransmission of the PUSCH) which corresponds to the DCI format(s) for the uplink with the CRC scrambled by the Temporary C-RNTI, in the random access procedure (e.g., in the contention based random access procedure). Here, the PUSCH transmission in the random access procedure (e.g., the contention based random access procedure) described herein may be assumed to be included in a fourth PUSCH transmission. Namely, the fourth PUSCH transmission may include the PUSCH transmission that corresponds to the random access response grant. Also, the fourth PUSCH transmission may include the PUSCH transmission that corresponds to the DCI format(s) for the uplink with the CRC scrambled by the Temporary C-RNTI. Also, the PUSCH (e.g., the PUSCH resources indicated by the random access response grant and/or the DCI format(s) for the uplink with the CRC scrambled by the Temporary C-RNTI) used for the fourth transmission described herein may be assumed to be included in a fourth PUSCH.

Here, the first PUSCH transmission may be skipped (e.g., dropped) for some cases. Namely, the UE 102 may skip (e.g., drop), based on a condition, the first PUSCH transmission. Namely, based on the condition, the UE 102 may not perform the first PUSCH transmission based on the condition. For example, in a case that the first PUSCH transmission collides with (e.g., coincides with) the second PUSCH transmission at the same timing, the first PUSCH transmission may be skipped. Namely, in a case that both of the first PUSCH transmission and the second PUSCH transmission would occur at the same timing, the first PUSCH transmission may be skipped. Namely, the second PUSCH transmission may be prioritized over the first PUSCH transmission. And, the UE 102 may perform the second PUSCH transmission only (i.e., in this timing).

Here, the PUSCH transmissions may be performed in a subframe, in a slot, and/or in a symbol. For example, the same timing may include the PUSCH transmissions (e.g., two PUSCH transmissions) that are performed, at least, in (e.g., within) one symbol (e.g., one OFDM symbol) on the same carrier (e.g., on the same serving cell, on a given serving cell (in a single serving cell), on the same UL BWP, and/or on a given UL BWP (e.g., in a single UL BWP)). Namely, the PUSCH transmissions (e.g., two PUSCH transmissions) are said to collide if the time occupancy of the PUSCHs scheduled to carry the UL-SCH and/or the SP-CSI report overlap in at least one symbol (e.g., one OFDM symbol) and are transmitted on the same carrier (e.g., on the same serving cell, on a given serving cell (in a single serving cell), on the same UL BWP, and/or on a given UL BWP (e.g., in a single UL BWP)).

Also, in a case that the first PUSCH transmission collides with (e.g., coincides with) the third PUSCH transmission at the same timing, the first PUSCH transmission may be skipped. Namely, in a case that both of the first PUSCH transmission and the third PUSCH transmission would occur at the same timing, the first PUSCH transmission may be skipped. Namely, the third PUSCH transmission may be prioritized over the first PUSCH transmission. And, the UE 102 may perform the third PUSCH transmission only (i.e., in this timing).

Also, in a case that the first PUSCH transmission collides with (e.g., coincides with) the fourth PUSCH transmission at the same timing, the first PUSCH transmission may be skipped. Namely, in a case that both of the first PUSCH transmission and the fourth PUSCH transmission would occur at the same timing, the first PUSCH transmission may be skipped. Namely, the fourth PUSCH transmission may be prioritized over the first PUSCH transmission. And, the UE 102 may perform the fourth PUSCH transmission only (i.e., in this timing).

Also, in a case that the first PUSCH transmission collides with (e.g., coincides with) the second PUSCH transmission at the same timing, the SP-CSI may be transmitted on the second PUSCH (e.g., the SP-CSI may be transmitted on the second PUSCH together with the UL-SCH). Namely, in a case that both of the first PUSCH transmission and the second PUSCH transmission would occur at the same timing, the SP-CSI may be transmitted on the second PUSCH (e.g., the SP-CSI may be transmitted on the second PUSCH together with the UL-SCH). Namely, the UE 102 may perform the transmission of the UL-SCH and the SP-CSI on the second PUSCH. Namely, in a case that the first PUSCH transmission collides with (e.g., coincides with) the second PUSCH transmission at the same timing, the UE 102 may transmit the SP-CSI (attempted for report on the first PUSCH) on the second PUSCH.

Also, in a case that the first PUSCH transmission collides with (e.g., coincides with) the third PUSCH transmission at the same timing, the SP-CSI may be transmitted on the third PUSCH (e.g., the SP-CSI may be transmitted on the third PUSCH together with the UL-SCH). Namely, in a case that both of the first PUSCH transmission and the third PUSCH transmission would occur at the same timing, the SP-CSI may be transmitted on the third PUSCH (e.g., the SP-CSI may be transmitted on the third PUSCH together with the UL-SCH). Namely, the UE 102 may perform the transmission of the UL-SCH and the SP-CSI on the third PUSCH. Namely, in a case that the first PUSCH transmission collides with (e.g., coincides with) the third PUSCH transmission at the same timing, the UE 102 may transmit the SP-CSI (attempted for report on the first PUSCH) on the third PUSCH.

Also, in a case that the first PUSCH transmission collides with (e.g., coincides with) the fourth PUSCH transmission at the same timing, the SP-CSI may be transmitted on the fourth PUSCH (e.g., the SP-CSI may be transmitted on the fourth PUSCH together with the UL-SCH). Namely, in a case that both of the first PUSCH transmission and the fourth PUSCH transmission would occur at the same timing, the SP-CSI may be transmitted on the fourth PUSCH (e.g., the SP-CSI may be transmitted on the fourth PUSCH together with the UL-SCH). Namely, the UE 102 may perform the transmission of the UL-SCH and the SP-CSI on the fourth PUSCH. Namely, in a case that the first PUSCH transmission collides with (e.g., coincides with) the fourth PUSCH transmission at the same timing, the UE 102 may transmit the SP-CSI (attempted for report on the first PUSCH) on the fourth PUSCH.

Here, the scheduling request (i.e., the SR) used for requesting the UL-SCH resources (e.g., for the initial transmission (e.g., new transmission)) may be transmitted on the PUSCH and/or the PUCCH. Here, the SR may be a positive SR (e.g., "1" for 1-bit information field for the SR) and/or a negative SR (e.g., "0" for the 1-bit information field for the SR). For example, the positive SR may be used for indicating that the UL-SCH resources (e.g., for the initial transmission (e.g., the new transmission)) are requested. Also, the negative SR may be used for indicating the UL-SCH resources (e.g., for the initial transmission (e.g., the new transmission)) are not requested.

Here, in a case that the first PUSCH transmission collides with (e.g., coincides with) the positive SR (i.e., the positive SR transmission) at the same timing, the first PUSCH transmission may be skipped. Namely, in a case that both of the first PUSCH transmission and the positive SR transmission would occur at the same timing, the first PUSCH transmission may be skipped. Namely, the positive SR transmission may be prioritized over the first PUSCH transmission. And, the UE 102 may perform the positive SR transmission only (i.e., in this timing). Namely, in a case that the SP-CSI and the positive SR are transmitted at the same timing, the UE 102 may transmit the positive SR (e.g., on the PUCCH and/or the PUSCH).

As described above, the SP-CSI (e.g., the SP-CSI reporting on the PUSCH) may be multiplexed with the uplink data (i.e., the UL-SCH, the UL-SCH data, the transport block) on the PUSCH. Namely, the SP-CSI may be transmitted on the PUSCH together with the uplink data. Also, the SP-CSI (e.g., the SP-CSI reporting on the PUSCH) may be performed (e.g., transmitted) without any multiplexing with the uplink data. Namely, the SP-CSI may be transmitted on the PUSCH without the uplink data.

Here, in a case that the first PUSCH transmission collides with (e.g., coincides with) the positive SR (i.e., the positive SR request transmission) at the same timing and the SP-CSI reporting on the PUSCH (e.g., the SP-CSI) is performed (e.g., transmitted) without the uplink data, the first PUSCH transmission may be skipped. Namely, in a case that both of the first PUSCH transmission and the positive SR transmission would occur at the same timing and the SP-CSI reporting on the PUSCH (e.g., the SP-CSI) is performed (e.g., transmitted) without the uplink data, the first PUSCH transmission may be skipped. Namely, the positive SR transmission may be prioritized over the first PUSCH transmission. And, the UE 102 may perform the positive SR transmission only (i.e., in this timing). Namely, in a case that the SP-CSI and the positive SR are transmitted at the same timing and the SP-CSI reporting on the PUSCH (e.g., the SP-CSI) is performed (e.g., transmitted) without the uplink data, the UE 102 may transmit the positive SR (e.g., on the PUCCH and/or the PUSCH). Namely, in a case that the SP-CSI (e.g., transmitted without the uplink data) and the positive SR are transmitted at the same timing, the UE 102 may transmit the positive SR (e.g., on the PUCCH and/or the PUSCH).

Namely, in a case that the first PUSCH transmission collides with (e.g., coincides with) the positive SR (i.e., the positive SR request transmission) at the same timing and the SP-CSI reporting on the PUSCH (e.g., the SP-CSI) is performed (e.g., transmitted) together with the uplink data, the positive SR transmission may be skipped. Namely, in a case that both of the first PUSCH transmission and the positive SR transmission would occur at the same timing and the SP-CSI reporting on the PUSCH (e.g., the SP-CSI) is performed (e.g., transmitted) together with the uplink data, the positive SR transmission may be skipped. Namely, the first PUSCH transmission may be prioritized over the positive SR transmission. And, the UE 102 may perform the SP-CSI reporting (i.e., in this timing) (e.g., together with the uplink data). Namely, in a case that the SP-CSI and the positive SR are transmitted at the same timing and the SP-CSI reporting on the PUSCH (e.g., the SP-CSI) is performed (e.g., transmitted) together with the uplink data, the UE 102 may perform the SP-CSI reporting on the PUSCH (e.g., together with the uplink data). Namely, in a case that the SP-CSI (e.g., transmitted together with the uplink data) and the positive SR are transmitted at the same timing, the UE 102 may perform the SP-CSI reporting on the PUSCH (e.g., together with the uplink data).

Also, in a case that the first PUSCH transmission collides with (e.g., coincides with) the SR transmission (e.g., the positive SR transmission and/or the negative SR transmission) at the same timing, the SR (e.g., the positive SR and/or the negative SR) may be transmitted on the first PUSCH (e.g., the SR may be transmitted on the first PUSCH together with the SP-CSI). Namely, in a case that both of the first PUSCH transmission and the SR transmission would occur at the same timing, the SR may be transmitted on the first PUSCH (e.g., the SR may be transmitted on the first PUSCH together with the SP-CSI). Namely, the UE 102 may perform the transmission of the SP-CSI and the SR on the first PUSCH. Namely, in a case that the first PUSCH transmission collides with (e.g., coincides with) the SR transmission at the same timing, the UE 102 may transmit the SR attempted for transmission on the PUCCH and/or the PUSCH is transmitted on the first PUSCH. Here, as described above, the SP-CSI reporting on the PUSCH (e.g., the SP-CSI) may be performed (e.g., transmitted) together with the uplink data. Also, the SP-CSI reporting on the PUSCH (e.g., the SP-CSI) may be performed (e.g., transmitted) without the uplink data. Namely, the SP-CSI (e.g., transmitted together with the uplink data) and the SR may be transmitted on the first PUSCH. Also, the SP-CSI (e.g., transmitted without the uplink data) and the SR may be transmitted on the first PUSCH.

Here, the combination of one or more of the some methods for the PUSCH transmissions described above may not be precluded. For example, in a case that the first PUSCH transmission collides with the second PUSCH transmission, the SP-CSI may be transmitted on the second PUSCH. Also, in a case that the first PUSCH transmission collides with the third PUSCH transmission, the SP-CSI may be transmitted on the third PUSCH. Also, in a case that the first PUSCH transmission collides with the fourth PUSCH transmission, the first PUSCH transmission may be skipped. Namely, in a case that the UE 102 may perform the PUSCH transmission(s), the SP-CSI may be transmitted on the PUSCH unless the PUSCH transmission(s) corresponds to the fourth PUSCH transmission. Namely, in a case that the PUSCH transmission corresponds to the fourth PUSCH transmission, the SP-CSI (e.g., the first PUSCH transmission) may be skipped.

Also, for example, in a case that the first PUSCH transmission collides with the second PUSCH transmission, the SP-CSI may be transmitted on the second PUSCH. Also, in a case that the first PUSCH transmission collides with the third PUSCH transmission, the first transmission may be skipped. Also, in a case that the first PUSCH transmission collides with the fourth PUSCH transmission, the first PUSCH transmission may be skipped. Namely, in a case that the UE 102 may perform the PUSCH transmission(s), the SP-CSI may be transmitted on the PUSCH unless the PUSCH transmission(s) corresponds to the third PUSCH transmission and/or the fourth PUSCH transmission. Namely, in a case that the PUSCH transmission corresponds to the third PUSCH transmission and/or the fourth PUSCH transmission, the SP-CSI (e.g., the first PUSCH transmission) may be skipped.

As described above, the first PUSCH transmission may be activated by using the DCI format(s) for the uplink (e.g., the DCI format(s) for the uplink with the CRC scrambled by the SP-CSI C-RNTI). Here, the UE 102 may transmit, based on reception of the DCI format(s) used for activation the first PUSCH transmission, confirmation information (e.g., also referred to as SP-CSI confirmation). Namely, in a case that the DCI format(s) used for indicating the SP-CSI activation is received, the UE 102 may trigger the SP-CSI confirmation. And, the UE 102 may transmit the SP-CSI confirmation. Here, the SP-CSI confirmation may be used for indicating a positive acknowledgment and/or a negative acknowledgment (i.e., HARQ-ACK) for the DCI format(s) used for indicating the SP-CSI activation. Also, the UE 102 may transmit the SP-CSI confirmation by using the PUSCH (e.g., the UL-SCH), the PUCCH, and/or the MAC CE. Namely, for example, the MAC CE for the SP-CSI confirmation (e.g., the SP-CSI confirmation for the DCI format(s) used for activating the SP-CSI reporting on the PUSCH) may be defined (e.g., specified, and/or configured).

Also, the first PUSCH transmission may be deactivated (e.g., released) by using the DCI format(s) for the uplink (e.g., the DCI format(s) for the uplink with the CRC scrambled by the SP-CSI C-RNTI). Here, the UE 102 may transmit, based on reception of the DCI format(s) used for deactivation the first PUSCH transmission, confirmation information (e.g., also referred to as SP-CSI confirmation). Namely, in a case that the DCI format(s) used for indicating the SP-CSI deactivation is received, the UE 102 may trigger the SP-CSI confirmation. And, the UE 102 may transmit the SP-CSI confirmation. Here, the SP-CSI confirmation may be used for indicating a positive acknowledgment and/or a negative acknowledgment (i.e., HARQ-ACK) for the DCI format(s) used for indicating the SP-CSI deactivation. Also, the UE 102 may transmit the SP-CSI confirmation by using the PUSCH (e.g., the UL-SCH), the PUCCH, and/or the MAC CE. Namely, for example, the MAC CE for the SP-CSI confirmation (e.g., the SP-CSI confirmation for the DCI format(s) used for deactivating the SP-CSI reporting on the PUSCH) may be defined (e.g., specified, and/or configured).

Here, the MAC PDU (i.e., MAC Protocol Data Unit) may be a bit string that is byte aligned (e.g., multiple of 8 bits) in length. Also, the MAC SDU (i.e., MAC Service Data Unit) may be a bit string that is byte aligned (e.g., multiple of 8 bits) in length. Here, the MAC SDU may be included into the MAC PDU from the first bit onward. Also, the MAC CE (i.e., MAC Control Element) may be a bit string that is byte aligned (e.g., multiple of 8 bits) in length. Also, the MAC subheader (e.g., also referred to as the MAC PDU subheader) may be a bit string that is byte aligned (e.g., multiple of 8 bits) in length. Here, each MAC subheader may be placed immediately in front of the corresponding MSC SDU, MAC CE, or padding. For example, the MAC PDU may comprise one or more MCA subPDUs. And, each MAC subPDU may consist of the MAC subheader only (e.g., including padding). Also, each MAC subPDU may consist of the MAC subheader and the MAC SDU. Also, each MAC subPDU may consist of the MAC subheader and the MAC CE. Also, each MAC subPDU may consist of the MAC subheader and the padding. And, for example, each MAC subheader may correspond to either the MAC SDU, the MAC CE, or the padding. Namely, the MAC subheader may correspond to the MAC SDU, the MAC CE, and/or the padding.

For example, the MAC CE may be identified by the MAC subheader (e.g., the MAC PDU subheader) with LCID (e.g., Logical Channel Identifier (e.g., Identification)). Here, the LCID (e.g., the LCID field(s)) may identify the logical channel instance of the corresponding MAC SDU, the type of the corresponding MAC CE, and/or the padding. For example, there may be one LCID field per the MAC subheader.

And, for example, the MAC CE for the SP-CSI confirmation for the DCI format(s) used for indicating the SP-CSI activation may be identified by using the MAC subheader (e.g., the MAC PDU subheader) with LCID. Also, the MAC CE for the SP-CSI confirmation for the DCI format(s) used for indicating the SP-CSI deactivation may be identified by using the MAC subheader (e.g., the MAC PDU subheader) with LCID.

Here, the same LCID (e.g., a single common LCID) may be used for identifying the MAC CE for the SP-CSI confirmation for the DCI format(s) used for indicating the SP-CSI activation and the MAC CE for the SP-CSI confirmation for the DCI format(s) for indicating the SP-CSI deactivation. Namely, the same LCID may be used for identifying the MAC CE for the SP-CSI confirmation for the SP-CSI activation and the MAC CE for the SP-CSI confirmation for the SP-CSI deactivation. For example, the index "110111" (i.e., a single common LCID) may be defined for a value of LCID for the MAC CE for the SP-CSI confirmation for the SP-CSI activation and the MAC CE for the SP-CSI confirmation for the SP-CSI deactivation.

Also, different LCID(s) may be used for identifying the MAC CE for the SP-CSI confirmation for the DCI format(s) used for indicating the SP-CSI activation and the MAC CE for the SP-CSI confirmation for the DCI format(s) used for indicating the SP-CSI deactivation. Namely, the different LCID(s) may be used for identifying the MAC CE for the SP-CSI confirmation for the SP-CSI activation and the MAC CE for the SP-CSI confirmation for the SP-CSI deactivation. For example, the index "110110" may be defined for a value of LCID for the MAC CE for the SP-CSI confirmation for the SP-CSI activation. Also, the index "110101" may be defined for a value of LCID for the MAC CE for the SP-CSI confirmation for the SP-CSI deactivation.

Here, a Logical Channel Prioritization procedure (e.g., LCP procedure) may be applied for the PUSCH transmissions. For example, the LCP procedure may be applied whenever an initial transmission (e.g., a new transmission) is performed. For example, the MAC entity (e.g., the MAC entity in the UE 102) may maintain a variable Bj for each logical channel j. Here, the Bj may be initialized to zero when the related logical channel is established, and incremented before every instance of the LCP procedure by the product PBR×T, where the PRB is Prioritized Bit Rate of logical channel j and T is the time elapsed since the Bj was last updated. Here, the value of Bj can never exceed the bucket size and if the value of Bj is larger than the bucket size of the logical channel j, it may be set to the bucket size. The bucket size of a logical channel is equal to PBR×BSD, where PBR and BSD may be configured by using the higher layer.

Also, the MAC entity (e.g., the MAC entity in the UE 102) may perform the following LCP procedure. Firstly, the MAC entity may select the logical channels (e.g., the logical channels for transmissions) based on one or more conditions. Also, the MAC entity may allocate resources (e.g., UL resources, the UL-SCH resources) to the logical channels (e.g., the logical channels selected) in the following three steps. In a first step (Step 1), all the logical channels with Bj>0 are allocated resources in a decreasing priority order. If the PBR of a logical channel is set to "infinity", the MAC entity may allocate resources for all the data that is available for transmission on the logical channel before meeting the PBR of the lower priority logical channel(s). In a second step (Step 2), the MAC entity may decrement Bj by the total size of MAC SDUs served to logical channel j in Step 1. It should be noted that the value of Bj can be negative. In a third step (Step 3), if any resources remain, all the logical channels are served in a strict decreasing priority order (regardless of the value of Bj) until either the data for that logical channel or the UL grant is exhausted, whichever comes first. Logical channels configured with equal priority should be served equally. Namely, for example, the UE 102 may allocate resources, according to a priority order (e.g., the LCP procedure), for all UL data (e.g., UL signal) that is available for transmission on the logical channel, and may not transmit UL data (e.g., UL signal) that is not available for transmission on the logical channel.

For example, the LCP procedure may be applied for the MAC CE for the SP-CSI confirmation for the DCI format(s) used for indicating the SP-CSI activation. Also, the LCP procedure may be applied for the MAC CE for the SP-CSI confirmation for the DCI format(s) used for indicating the SP-CSI deactivation. For example, in a case that the different values of LCIDs are defined for the MAC CE for the SP-CSI confirmation for the DCI format(s) used for indicating the SP-CSI activation and the MAC CE for the SP-CSI confirmation for the DCI format(s) used for indicating the SP-CSI deactivation, the LCP procedure may be applied for each of the MAC CEs.

Here, for example, in the LCP procedure (e.g., for the LCP procedure), the MAC CE for the SP-CSI confirmation for the DCI format(s) used for indicating the SP-CSI activation may be prioritized over the MAC CE for the SP-CSI confirmation for the DCI format(s) used for indicating the SP-CSI deactivation. Namely, in the LCP procedure, the MAC CE for the SP-CSI confirmation for the DCI format(s) used for indicating the SP-CSI activation may be higher priority than the MAC CE for the SP-CSI confirmation for the DCI format(s) used for indicating the SP-CSI deactivation. Also, in the LCP procedure, the MAC CE for the SP-CSI confirmation for the DCI format(s) used for indicating the SP-CSI deactivation may be prioritized over the MAC CE for the SP-CSI confirmation for the DCI format(s) used for indicating the SP-CSI activation. Namely, in the LCP procedure, the MAC CE for the SP-CSI confirmation for the DCI format(s) used for indicating the SP-CSI deactivation may be higher priority than the MAC CE for the SP-CSI confirmation for the DCI format(s) used for indicating the SP-CSI activation.

Also, the third PUSCH transmission may be activated by using the DCI format(s) for the uplink (e.g., the DCI format(s) for the uplink with the CRC scrambled by the CS-RNTI). Here, the UE 102 may transmit, based on reception of the DCI format(s) used for activation the third PUSCH transmission, confirmation information (e.g., also referred to as CG confirmation (e.g., Configured Grant confirmation)). Namely, in a case that the DCI format(s) used for indicating the configured grant (e.g., the configured grant Type 2) activation is received, the UE 102 may trigger the CG confirmation. And, the UE 102 may transmit the CG confirmation. Here, the CG confirmation may be used for indicating a positive acknowledgment and/or a negative acknowledgment (i.e., HARQ-ACK) for the DCI format(s) used for indicating the configured grant activation. Also, the UE 102 may transmit the CG confirmation by using the PUSCH (e.g., the UL-SCH), the PUCCH, and/or the MAC CE. Namely, for example, the MAC CE for the CG confirmation (e.g., the CG confirmation for the DCI format(s) used for the configured grant activation) may be defined (e.g., specified, and/or configured).

Also, the third PUSCH transmission may be deactivated (e.g., released) by using the DCI format(s) for the uplink (e.g., the DCI format(s) for the uplink with the CRC scrambled by the CS-RNTI). Here, the UE 102 may transmit, based on reception of the DCI format(s) used for deactivation the third PUSCH transmission, confirmation information (e.g., also referred to as CG confirmation). Namely, in a case that the DCI format(s) used for indicating the configured grant (e.g., the configured grant Type 2) deactivation is received, the UE 102 may trigger the CG confirmation. And, the UE 102 may transmit the CG confirmation. Here, the CG confirmation may be used for indicating a positive acknowledgment and/or a negative acknowledgment (i.e., HARQ-ACK) for the DCI format(s) used for indicating the configured grant deactivation. Also, the UE 102 may transmit the CG confirmation by using the PUSCH (e.g., the UL-SCH), the PUCCH, and/or the MAC CE. Namely, for example, the MAC CE for the CG confirmation (e.g., the CG confirmation for the DCI format(s) used for the configured grant) may be defined (e.g., specified, and/or configured).

And, for example, the MAC CE for the CG confirmation for the DCI format(s) used for indicating the configured grant activation may be identified by using the MAC subheader (e.g., the MAC PDU subheader) with LCID. Also, the MAC CE for the CG confirmation for the DCI format(s) used for indicating the configured deactivation may be identified by using the MAC subheader (e.g., the MAC PDU subheader) with LCID.

Here, the same LCID (e.g., a single common LCID) may be used for identifying the MAC CE for the CG confirmation for the DCI format(s) used for indicating the configured grant (e.g., the configured grant Type 2) activation and the MAC CE for the CG confirmation for the DCI format(s) for indicating the configured grant (e.g., the configured grant Type 2) deactivation. Namely, the same LCID may be used for identifying the MAC CE for the CG confirmation for the configured grant activation and the MAC CE for the CG confirmation for the configured grant deactivation. For example, the index "111000" (i.e., a single common LCID) may be defined for a value of LCID for the MAC CE for the CG confirmation for the configured grant activation and the MAC CE for the CG confirmation for the configured grant deactivation.

Also, different LCID(s) may be used for identifying the MAC CE for the CG confirmation for the DCI format(s) used for indicating the configured grant (e.g., the configured grant Type 2) activation and the MAC CE for the CG confirmation for the DCI format(s) used for indicating the configured grant (e.g., the configured grant Type 2) deactivation. Namely, the different LCID(s) may be used for identifying the MAC CE for the CG confirmation for the configured grant activation and the MAC CE for the CG confirmation for the configured grant deactivation. For example, the index "110101" may be defined for a value of LCID for the MAC CE for the CG confirmation for the configured grant activation. Also, the index "110100" may be defined for a value of LCID for the MAC CE for the CG confirmation for the configured grant deactivation.

Also, the LCP procedure may be applied for the MAC CE for the CG confirmation for the DCI format(s) used for indicating the configured grant (e.g., the configured grant Type 2) activation. Also, the LCP procedure may be applied for the MAC CE for the CG confirmation for the DCI format(s) used for indicating the configured grant (e.g., the configured grant Type 2) deactivation. For example, in a case that the different values of LCIDs are defined for the MAC CE for the CG confirmation for the DCI format(s) used for indicating the configured grant activation and the MAC CE for the CG confirmation for the DCI format(s) used for indicating the configured grant deactivation, the LCP procedure may be applied for each of the MAC CEs.

Here, for example, in the LCP procedure (e.g., for the LCP procedure), the MAC CE for the CG confirmation for the DCI format(s) used for indicating the configured grant activation may be prioritized over the MAC CE for the CG confirmation for the DCI format(s) used for indicating the configured grant deactivation. Namely, in the LCP procedure, the MAC CE for the CG confirmation for the DCI format(s) used for indicating the configured grant activation may be higher priority than the MAC CE for the CG confirmation for the DCI format(s) used for indicating the configured grant deactivation. Also, in the LCP procedure, the MAC CE for the CG confirmation for the DCI format(s) used for indicating the configured grant deactivation may be prioritized over the MAC CE for the CG confirmation for the DCI format(s) used for indicating the configured grant activation. Namely, in the LCP procedure, the MAC CE for the CG confirmation for the DCI format(s) used for indicating the configured grant deactivation may be higher priority than the MAC CE for the CG confirmation for the DCI format(s) used for indicating the configured grant activation.

Also, the same LCID (e.g., a single common LCID) may be used for identifying the MAC CE for the SP-CSI confirmation (e.g., for the DCI format(s) used for indicating the SP-CSI activation and/or deactivation) and the MAC CE for the CG confirmation (e.g., for the DCI format(s) used for indicating the configured grant (e.g., the configured grant Type 2) activation and/or deactivation). Namely, the same LCID may be used for identifying the MAC CE for the SP-CSI confirmation and the MAC CE for the CG confirmation. For example, the index "110011" (i.e., a single common LCID) may be defined for a value of LCID for the MAC CE for the SP-CSI confirmation and the MAC CE for the CG confirmation.

Also, different LCID(s) may be used for identifying the MAC CE for the SP-CSI confirmation (e.g., for the DCI format(s) used for indicating the SP-CSI activation and/or deactivation) and the MAC CE for the CG confirmation (e.g., for the DCI format(s) used for indicating the configured grant (e.g., the configured grant Type 2) activation and/or deactivation). Namely, the different LCID(s) may be used for identifying the MAC CE for the SP-CSI confirmation and the MAC CE for the CG confirmation. For example, the index "111101" may be defined for a value of LCID for the MAC CE for the SP-CSI confirmation. Also, the index "100100" may be defined for a value of LCID for the MAC CE for the CG confirmation.

Also, the LCP procedure may be applied for the MAC CE for the SP-CSI confirmation (e.g., the SP-CSI confirmation for the DCI format(s) used for indicating the SP-CSI activation and/or deactivation). Also, the LCP procedure may be applied for the MAC CE for the CG confirmation (e.g., for the DCI format(s) used for indicating the configured grant (e.g., the configured grant Type 2) activation and/or deactivation). For example, in a case that the different values of LCIDs are defined for the MAC CE for the SP-CSI confirmation and the MAC CE for the CG confirmation, the LCP procedure may be applied for each of the MAC CEs.

Here, for example, in the LCP procedure (e.g., for the LCP procedure), the MAC CE for the SP-CSI confirmation may be prioritized over the MAC CE for the CG confirmation. Namely, in the LCP procedure, the MAC CE for the SP-CSI confirmation may be higher priority than the MAC CE for the CG confirmation. Also, in the LCP procedure, the MAC CE for the CG confirmation may be prioritized over the MAC CE for the SP-CSI confirmation. Namely, in the LCP procedure, the MAC CE for the CG confirmation may be higher priority than the MAC CE for the SP-CSI confirmation.

Figure 7:
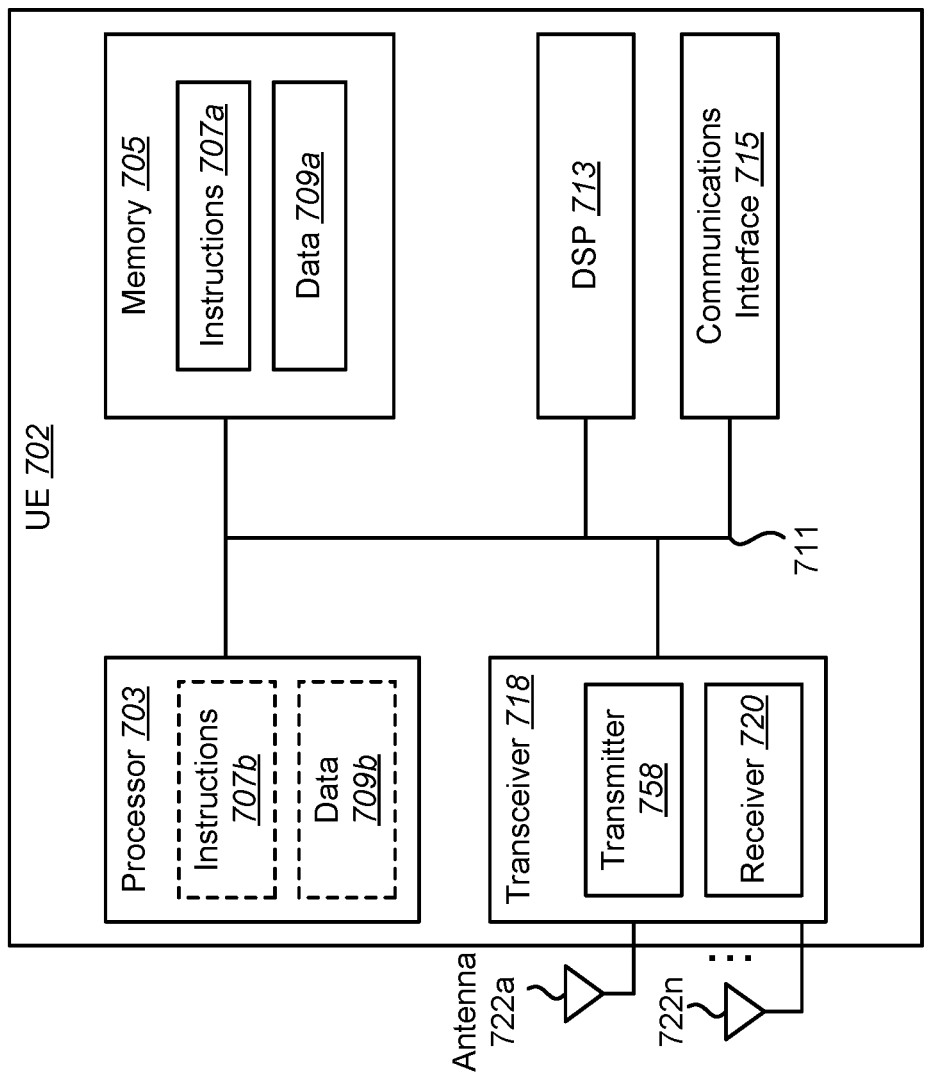
FIG. 7 illustrates various components that may be utilized in a UE.

FIG. 7 illustrates various components that may be utilized in a UE 702. The UE 702 described in connection with FIG. 7 may be implemented in accordance with the UE 102 described in connection with FIG. 1. The UE 702 includes a processor 703 that controls operation of the UE 702. The processor 703 may also be referred to as a central processing unit (CPU). Memory 705, which may include read-only memory (ROM), random access memory (RAM), a combination of the two or any type of device that may store information, provides instructions 707a and data 709a to the processor 703. A portion of the memory 705 may also include non-volatile random access memory (NVRAM). Instructions 707b and data 709b may also reside in the processor 703. Instructions 707b and/or data 709b loaded into the processor 703 may also include instructions 707a and/or data 709a from memory 705 that were loaded for execution or processing by the processor 703. The instructions 707b may be executed by the processor 703 to implement the methods described above.

The UE 702 may also include a housing that contains one or more transmitters 758 and one or more receivers 720 to allow transmission and reception of data. The transmitter(s) 758 and receiver(s) 720 may be combined into one or more transceivers 718. One or more antennas 722a-n are attached to the housing and electrically coupled to the transceiver 718.

The various components of the UE 702 are coupled together by a bus system 711, which may include a power bus, a control signal bus and a status signal bus, in addition to a data bus. However, for the sake of clarity, the various buses are illustrated in FIG. 7 as the bus system 711. The UE 702 may also include a digital signal processor (DSP) 713 for use in processing signals. The UE 702 may also include a communications interface 715 that provides user access to the functions of the UE 702. The UE 702 illustrated in FIG. 7 is a functional block diagram rather than a listing of specific components.

Figure 8:
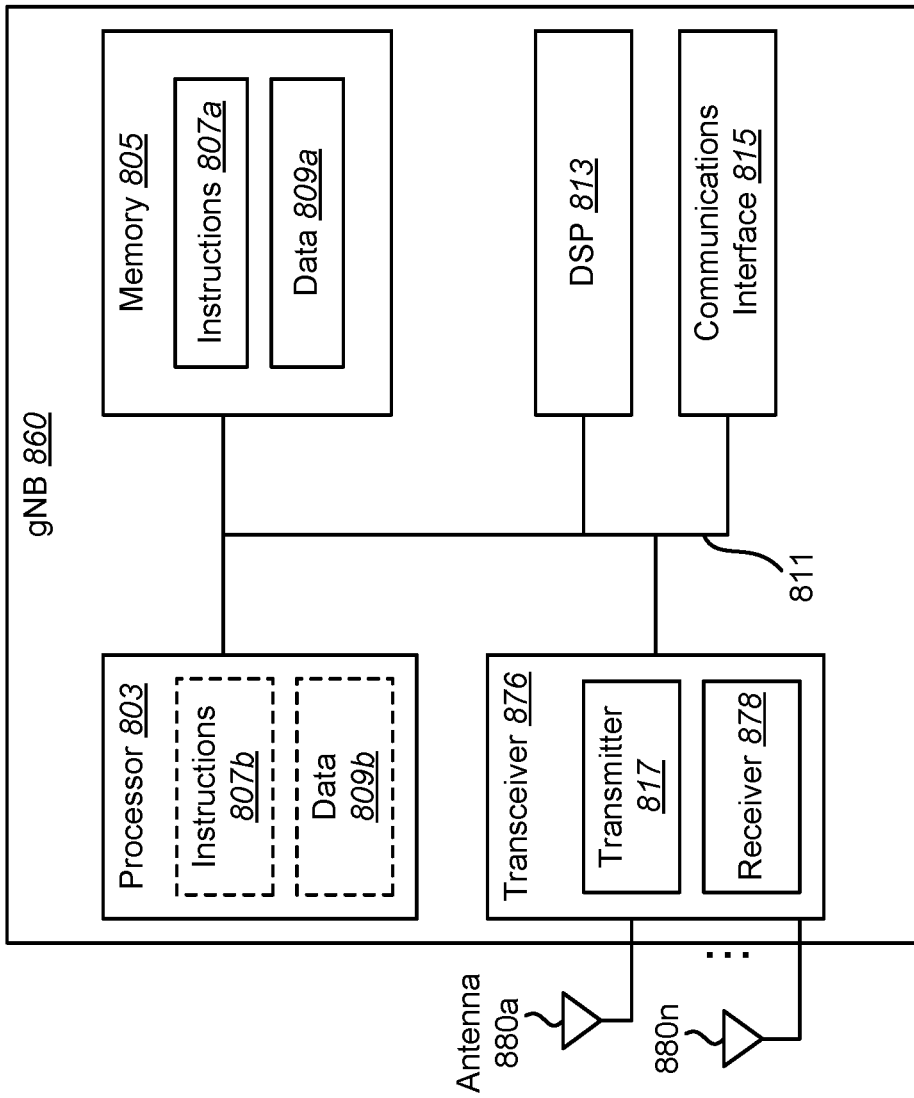
FIG. 8 illustrates various components that may be utilized in a gNB.

FIG. 8 illustrates various components that may be utilized in a gNB 860. The gNB 860 described in connection with FIG. 8 may be implemented in accordance with the gNB 160 described in connection with FIG. 1. The gNB 860 includes a processor 803 that controls operation of the gNB 860. The processor 803 may also be referred to as a central processing unit (CPU). Memory 805, which may include read-only memory (ROM), random access memory (RAM), a combination of the two or any type of device that may store information, provides instructions 807a and data 809a to the processor 803. A portion of the memory 805 may also include non-volatile random access memory (NVRAM). Instructions 807b and data 809b may also reside in the processor 803. Instructions 807b and/or data 809b loaded into the processor 803 may also include instructions 807a and/or data 809a from memory 805 that were loaded for execution or processing by the processor 803. The instructions 807b may be executed by the processor 803 to implement the methods described above.

The gNB 860 may also include a housing that contains one or more transmitters 817 and one or more receivers 878 to allow transmission and reception of data. The transmitter(s) 817 and receiver(s) 878 may be combined into one or more transceivers 876. One or more antennas 880a-n are attached to the housing and electrically coupled to the transceiver 876.

The various components of the gNB 860 are coupled together by a bus system 811, which may include a power bus, a control signal bus and a status signal bus, in addition to a data bus. However, for the sake of clarity, the various buses are illustrated in FIG. 8 as the bus system 811. The gNB 860 may also include a digital signal processor (DSP) 813 for use in processing signals. The gNB 860 may also include a communications interface 815 that provides user access to the functions of the gNB 860. The gNB 860 illustrated in FIG. 8 is a functional block diagram rather than a listing of specific components.

Figure 9:
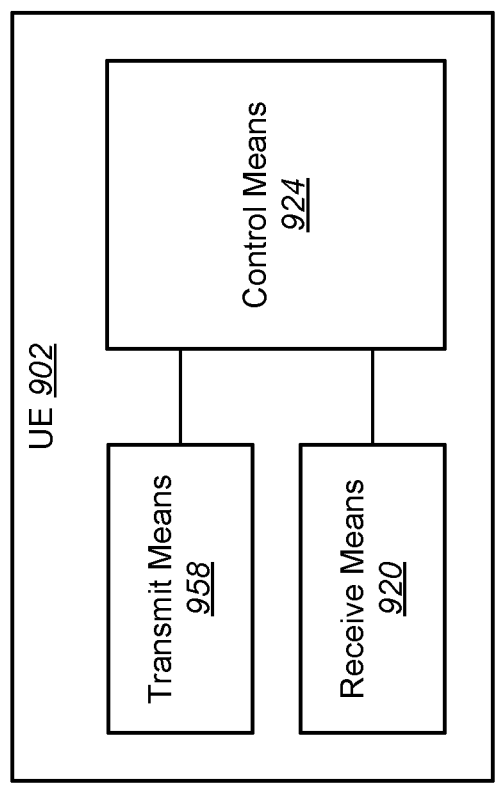
FIG. 9 is a block diagram illustrating one implementation of a UE in which systems and methods for downlink and/or uplink (re)transmissions may be implemented.

FIG. 9 is a block diagram illustrating one implementation of a UE 902 in which systems and methods for downlink and/or uplink (re)transmissions may be implemented. The UE 902 includes transmit means 958, receive means 920 and control means 924. The transmit means 958, receive means 920 and control means 924 may be configured to perform one or more of the functions described in connection with FIG. 1 above. FIG. 7 above illustrates one example of a concrete apparatus structure of FIG. 9. Other various structures may be implemented to realize one or more of the functions of FIG. 1. For example, a DSP may be realized by software.

Figure 10:
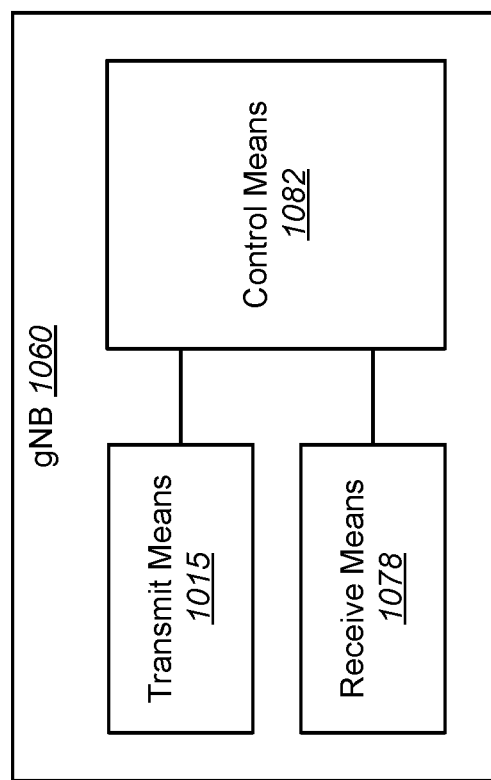
FIG. 10 is a block diagram illustrating one implementation of a gNB in which systems and methods for downlink and/or uplink (re)transmissions may be implemented.

FIG. 10 is a block diagram illustrating one implementation of a gNB 1060 in which systems and methods for downlink and/or uplink (re)transmissions may be implemented. The gNB 1060 includes transmit means 1017, receive means 1078 and control means 1082. The transmit means 1017, receive means 1078 and control means 1082 may be configured to perform one or more of the functions described in connection with FIG. 1 above. FIG. 8 above illustrates one example of a concrete apparatus structure of FIG. 10. Other various structures may be implemented to realize one or more of the functions of FIG. 1. For example, a DSP may be realized by software.

Figure 11:
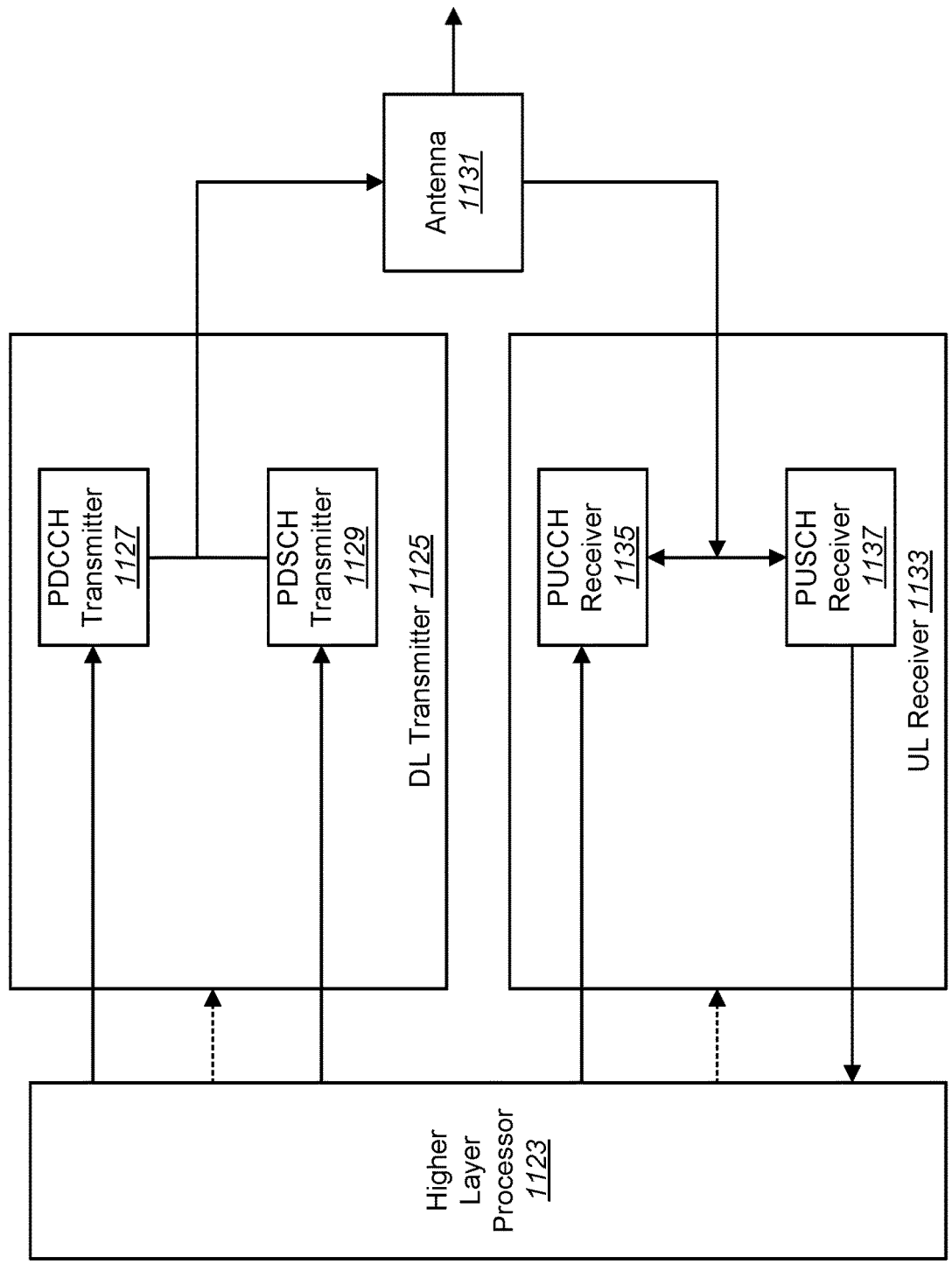
FIG. 11 is a block diagram illustrating one implementation of a gNB.

FIG. 11 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
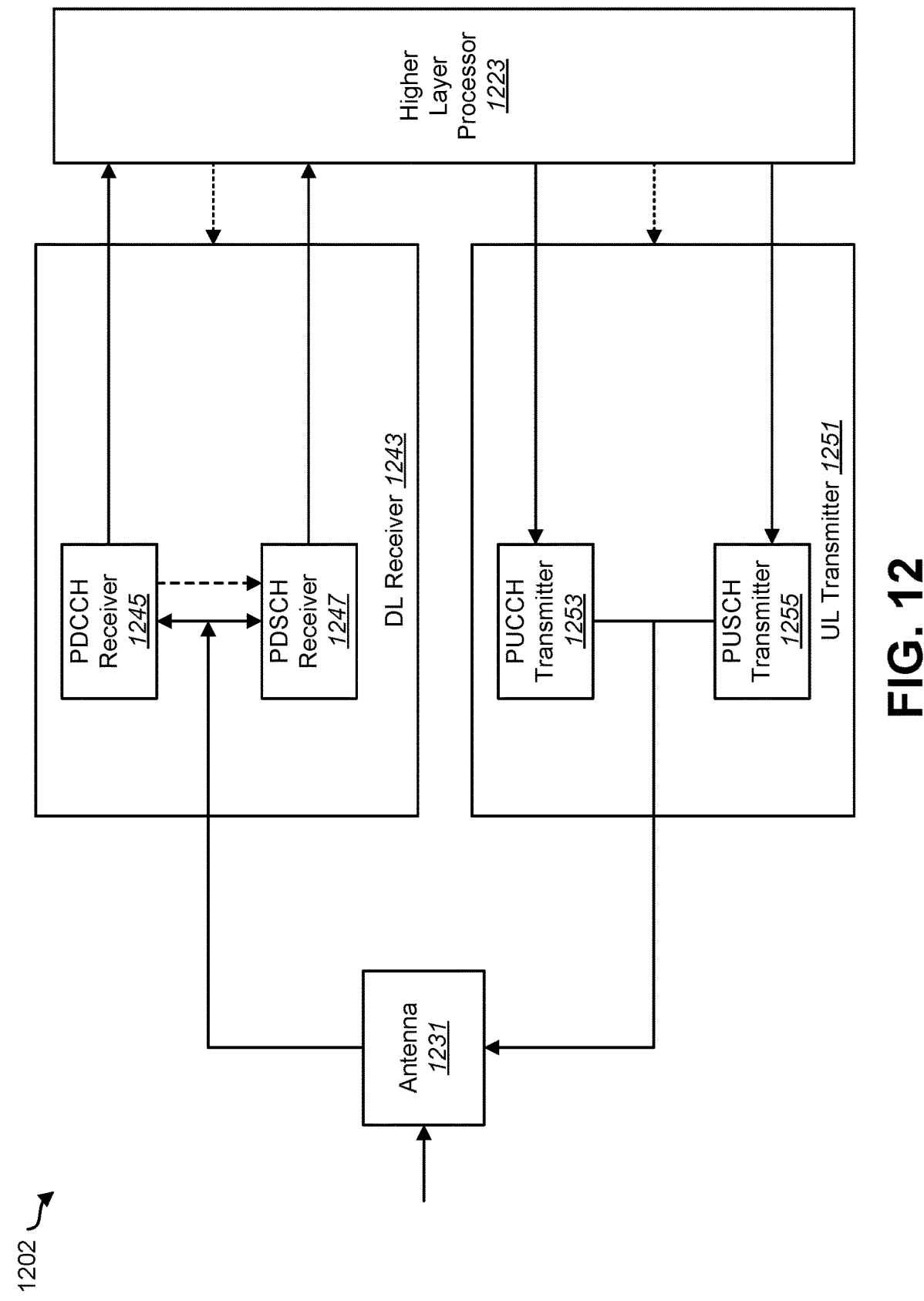
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

As described above, some methods for the UL transmissions (e.g., the PUSCH transmission) may be applied (e.g., specified). Here, the combination of one or more of the some methods described above may be applied for the UL transmission (e.g., the PUSCH transmissions). The combination of the one or more of the some methods described above may not be precluded in the described systems and methods.

It should be noted that names of physical channels described herein are examples. The other names such as "NRPDCCH, NRPDSCH, NRPUCCH and NRPUSCH," "new Generation-(G)PDCCH, GPDSCH, GPUCCH and GPUSCH" or the like can be used.

The term "computer-readable medium" refers to any available medium that can be accessed by a computer or a processor. The term "computer-readable medium," as used herein, may denote a computer- and/or processor-readable medium that is non-transitory and tangible. By way of example and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD and the like), a magnetic storage medium (for example, a magnetic tape, a flexible disk and the like) and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

The invention claimed is:

1. A user equipment (UE) comprising:
    receiving circuitry configured to receive, from a base station apparatus, a radio resource control (RRC) message comprising first information used for configuring a periodicity for a physical downlink control channel (PDCCH) monitoring,
    the receiving circuitry being configured to monitor, based on the first information, the PDCCH for a downlink control information (DCI) format with cyclic redundancy check (CRC) scrambled by a semi-persistent channel state information radio network temporary identifier (SP-CSI-RNTI), the DCI format being used for scheduling of a physical uplink shared channel (PUSCH),
    transmitting circuitry configured to perform, based on decoding of the DCI format, semi-persistent CSI reporting on the PUSCH based on a parameter, the parameter being indicated by using a CSI request field comprised in the DCI format, and
    processing circuitry configured to drop the semi-persistent CSI reporting in a case that the semi-persistent CSI reporting overlaps in time with an uplink shared channel (UL-SCH) transmission on the PUSCH in one symbol, wherein
    the processing circuitry is configured to drop the semi-persistent CSI reporting in a case that the semi-persistent CSI reporting is being performed without multiplexing with an UL-SCH data and the semi-persistent CSI reporting overlaps with a positive scheduling request (SR) transmission on a physical uplink control channel (PUCCH).

2. A base station apparatus comprising:
    transmitting circuitry configured to transmit, to a user equipment (UE), a radio resource control (RRC) message comprising first information used for configuring a periodicity for a physical downlink control channel (PDCCH) monitoring,
    the transmitting circuitry being configured to transmit on a physical downlink control channel (PDCCH), based on the first information, a downlink control information (DCI) format with cyclic redundancy check (CRC) scrambled by a semi-persistent channel state information radio network temporary identifier (SP-CSI-RNTI), the DCI format being used for scheduling of a physical uplink shared channel (PUSCH), and
    receiving circuitry configured to receive, based on transmitting of the DCI format, semi-persistent CSI reporting on the PUSCH based on a parameter, the parameter being indicated by using a CSI request field comprised in the DCI format, wherein
    the receiving circuitry is configured to receive an uplink shared channel (UL-SCH) transmission on the PUSCH in one symbol in a case that the semi-persistent CSI reporting overlaps in time with the UL-SCH transmission on the PUSCH in one symbol, wherein
    the receiving circuitry is configured to receive a positive scheduling request (SR) transmission on a physical uplink control channel (PUCCH) in a case that the semi-persistent CSI reporting is being performed without multiplexing with an UL-SCH data and the semi-persistent CSI reporting overlaps with the SR transmission on the PUCCH.

3. A communication method of a user equipment (UE) comprising:
    receiving, from a base station apparatus, a radio resource control (RRC) message comprising first information used for configuring a periodicity for a physical downlink control channel (PDCCH) monitoring,
    monitoring, based on the first information, the PDCCH for a downlink control information (DCI) format with cyclic redundancy check (CRC) scrambled by a semi-persistent channel state information radio network temporary identifier (SP-CSI-RNTI), the DCI format being used for scheduling of a physical uplink shared channel (PUSCH), and
    performing, based on decoding of the DCI format, semi-persistent CSI reporting on the PUSCH based on a parameter, the parameter being indicated by using a CSI request field comprised in the DCI format, wherein
    dropping the semi-persistent CSI reporting in a case that the semi-persistent CSI reporting overlaps in time with an uplink shared channel (UL-SCH) transmission on the PUSCH in one symbol, and
    dropping the semi-persistent CSI reporting in a case that the semi-persistent CSI reporting is being performed without multiplexing with an UL-SCH data and the semi-persistent CSI reporting overlaps with a positive scheduling request (SR) transmission on a physical uplink control channel (PUCCH).

4. A communication method of a base station apparatus comprising:
    transmitting, to a user equipment (UE), a radio resource control (RRC) message comprising first information used for configuring a periodicity for a physical downlink control channel (PDCCH) monitoring,
    transmitting on a physical downlink control channel (PDCCH), based on the first information, a downlink control information (DCI) format with cyclic redundancy check (CRC) scrambled by a semi-persistent channel state information radio network temporary identifier (SP-CSI-RNTI), the DCI format being used for scheduling of a physical uplink shared channel (PUSCH), receiving, based on transmitting of the DCI format, semi-persistent CSI reporting on the PUSCH based on a parameter, the parameter being indicated by using a CSI request field comprised in the DCI format, wherein receiving an uplink shared channel (UL-SCH) transmission on the PUSCH in one symbol in a case that the semi-persistent CSI reporting overlaps in time with the UL-SCH transmission on the PUSCH in one symbol, and receiving a positive scheduling request (SR) transmission on a physical uplink control channel (PUCCH) in a case that the semi-persistent CSI reporting is being performed without multiplexing with an UL-SCH data and the semi-persistent CSI reporting overlaps with the SR transmission on the PUCCH.

* * * * *